United States Patent
Zhou et al.

(10) Patent No.: US 11,143,776 B2
(45) Date of Patent: Oct. 12, 2021

(54) COMPUTER-IMPLEMENTED METHOD AND SYSTEM FOR SMALL CAVE RECOGNITION USING SEISMIC REFLECTION DATA

(71) Applicants: China Petroleum & Chemical Corporation, Beijing (CN); Sinopec Tech Houston, Houston, TX (US)

(72) Inventors: Min Zhou, Houston, TX (US); Franklin Ruiz, Houston, TX (US)

(73) Assignees: China Petroleum & Chemical Corporation, Beijing (CN); Sinopec Tech Houston, Houston, TX (US)

( * ) Notice: Subject to any disclaimer, the term of this patent is extended or adjusted under 35 U.S.C. 154(b) by 0 days.

(21) Appl. No.: 16/792,698

(22) Filed: Feb. 17, 2020

(65) Prior Publication Data

US 2021/0255349 A1 Aug. 19, 2021

(51) Int. Cl.
*G01V 1/50* (2006.01)
*G01V 1/30* (2006.01)
*G06F 17/17* (2006.01)
*G01V 1/28* (2006.01)

(52) U.S. Cl.
CPC ............... *G01V 1/50* (2013.01); *G01V 1/282* (2013.01); *G01V 1/303* (2013.01); *G06F 17/17* (2013.01); *G01V 2210/22* (2013.01); *G01V 2210/6222* (2013.01)

(58) Field of Classification Search
CPC .......... G01V 1/50; G01V 1/282; G01V 1/303; G01V 2010/22; G01V 2010/6222; G01V 1/345; G01V 8/10; G01V 99/00; G06F 17/17
See application file for complete search history.

(56) References Cited

U.S. PATENT DOCUMENTS

| | | |
|---|---|---|
| 5,503,225 A | 4/1996 | Withers |
| 6,151,555 A | 11/2000 | Bemmerl |
| 6,473,696 B1 | 10/2002 | Onyia |

(Continued)

OTHER PUBLICATIONS

Sava, P., and Biondi, B.; Wave-equation migration velocity analysis—I: Theory; Geophysical Prospecting, accepted for publication; Stanford Exploration Project, Mitchell Bldg., Department of Geophysics, Stanford University, Stanford CA 94305-22215 (Jul. 22, 2004).

(Continued)

*Primary Examiner* — Elias Desta
(74) *Attorney, Agent, or Firm* — Ignacio Bellver

(57) ABSTRACT

A computer-implemented method and system implementing the method, are disclosed for computing small cave recognition models, using seismic reflection data. User inputs and earth-model data are obtained over points of incidence of a survey region, at various angles of incidence. Various models are then computed that serve for cave identification and take part in preliminary seismic exploration and reservoir characterization. Therefore, the attributes developed by the computer-implemented method and system serve as indicators of low velocity and density cave recognition which are capable of separating the cave events from the normal layer events; identifying caves with size larger than half to one wavelength of the dominant signal; and identifying cave diffractions from caves that contain a local maximal/minimal at around nine degrees in amplitude versus angle models.

9 Claims, 14 Drawing Sheets

(56) References Cited

U.S. PATENT DOCUMENTS

| | | |
|---|---|---|
| 6,904,368 B2 | 6/2005 | Reshef |
| 7,355,923 B2 | 4/2008 | Reshef |
| 8,379,482 B1 | 2/2013 | Khare |
| 8,902,702 B2 * | 12/2014 | Hirabayashi ............. G01V 1/42 367/31 |
| 9,244,183 B2 | 1/2016 | Sil |
| 10,126,446 B2 | 11/2018 | Brender |
| 2018/0067219 A1 * | 3/2018 | Xu ......................... G01V 1/307 |

OTHER PUBLICATIONS

Schneider, W. A.; Integral formulation for migration in two and three dimensions; Geophysics vol. 43, No. 1; pp. 49-76 (Feb. 1978).
Jones, I. F.; Tutorial: Velocity estimation via ray-based tomography; First Break vol. 28 (Feb. 2010).
Bancroft, J. C., Richards, A., Ursenbach, C.; Statics: the abusive power of trimming; CREWES Research Report, vol. 12 (2000).
Russel, B.; "Prestack seismic amplitude analysis: an integrated overview: Interpretation" (2014), v.2, No. 2, SC19-SC36.

* cited by examiner

COMPUTER-IMPLEMENTED METHOD AND SYSTEM FOR SMALL CAVE RECOGNITION USING SEISMIC REFLECTION DATA

TECHNICAL FIELD

The present disclosure relates generally to computer-implemented methods and systems for seismic exploration of subsurface interfaces with impedance contrasts, image and angle gather containing information about the amplitude variation with angle lithology.

BACKGROUND OF INVENTION

1. Overview

Seismic exploration, also called seismic survey, involves the study of subsurface formations of interest and geological structures. In general, the purpose of seismic exploration is to image the subsurface of a survey region to identify potential locations of hydrocarbon underneath the surface. Typically, seismic exploration and reservoir characterizations are performed over a region that is surveyed for its soil, and fluid potential properties. Depending upon the properties found in the survey region, one or various hydrocarbon reservoirs (i.e., oil and gas) may be established. Sometimes, these reservoirs may be found inside subsurface structures or formations, like caves, caverns, or rocks.

In seismic exploration, one or more sources of seismic energies are placed at various locations near the surface of the earth to generate a signal in the form of waves, which travel downward through the earth while entering subsurface formations, like rocks, and caves. Once the waves, generated as a result of the emitted seismic energy, enter the subsurface formation, they get reflected, refracted, or scattered throughout the subsurface, which are then captured by receiving sensors that records, samples or measures said waves. The recorded waves are commonly referred to in the art, as seismic data or seismic traces. These data, or traces may contain information regarding the geological structure and properties of the survey region being explored. They are then analyzed using computer-implemented methods to extract details of the structure and properties of the survey region of the earth being explored. Many of these computer-implemented methods use an inversion model which comprise of an analytical approach in which depth-domain signals corresponding to the reflection of acoustic energy from reflective interfaces between subsurface strata in the earth are converted into one or more traces representative of physical attributes of the strata. In contrast, additional computer-implemented methods are required to provide for more specific lithology identification and fluid discrimination, in the field of seismic exploration and reservoir characterization, mainly using amplitude variation with angle (AVA), intercept and gradient volumes to successfully, efficiently, and accurately identify the diffractions associated with small karst caves (size smaller than half seismic wavelength) that contain low velocity (v) and density ($\rho$) from reflection events of overburden and carbonate background layers.

Nevertheless, most subsurface formations of interest (or geological structures) have developed fractures which were originated during karstification, and these karst systems were then buried underground in the form of caves. These caves then turned into the main storage space for hydrocarbon but contained fractured zones which, in a sense made the key content of karst characterization, to become cave identification instead (Tian F, X. B Lu, S. Q Zheng, H. F Zhang, Y. S Rong, D. B Yang, and N. G Liu. 2017, *Structure and filling characteristics of paleokarst reservoirs in the northern Tarim basin, revealed by outcrop, core and borehole images*; Open Geoscience vol. 9 pp. 266-280; and Tian F, Z. X Wang, F. Q Cheng, W Xin, O Fayemi, W Zhang, and X. C Shan. 2019, *Three-dimensional geophysical characterization of deeply buried paleokarst system in the Tahe oilfield, Tarim basin, China*; Water vol. 11(5), p. 1045.). As this is not an easy task, a multi-prong approach of core sample description, well logging interpretation, 3D seismic modeling, and high-resolution impedance dataset was originally proposed by Fei Tian, et al., supra, (2019) to delineate the 3D geometry of the paleo-caves and other paleo-karst oil fields. Yet, this has still to assist those skilled in the art with small cave identification, as it further requires using innovative computer-implemented methods, to solve the problem of small cave identification.

2. Analysis of Waves

It is known by persons of ordinary skill in the art, that depth-domain seismic images from the reverse-time-migration (RTM) model, reveal the reflectivity from subsurface interfaces with impedance contrasts; and angle gathers contain information about the amplitude variation with angle (AVA). It is also known that fractured-cave systems with different scales and sizes, are common features in carbonate fractured reservoirs. These systems contribute a lot to the production of oil and gas because they provide both storage spaces and migration pathways for hydrocarbons. Using seismic data, like prestack gathers and seismic attributes to identify the characteristics of the fractured-cave system, is a key approach to better understand the carbonate pathway of fractured reservoirs. As such, several methods have been proposed.

For instance, the coherence algorithm (See Marfurt K. J, R. L Kirlin, S. L Farmer and M. S Bahorich 1998, *3D seismic attributes using a semblance-based coherence algorithm* Geophysics vol. 63 pp. 1150-1165), the variance algorithm (See U.S. Pat. No. 6,151,555), and the curvature algorithm (See Roberts A. 2001, *Curvature attributes and their application to 3D interpreted horizons*, First Break vol. 19 pp. 85-100, and Marfurt K. J., 2006, *Robust estimates of 3D reflector dip and azimuth*, Geophysics vol. 71 pp. 29-7140) to just name a few, are popular methods in the art, used to characterize the physical properties of fractures using seismic attributes. On the other hand, the amplitude versus azimuth inversion for velocity anisotropy (Rüger A. and Tsvankin I., 1997, *Using AVO for fracture detection: analytic basis and practical solutions*, The Leading Edge vol. 16 pp. 1429-1434, and Bachrach R., Sengupta M., Salama A. and Miller P., 2009, *Reconstruction of the layer anisotropic elastic parameters and high resolution fracture characterization from P-wave data: a case study using seismic inversion and Bayesian rock physics parameter estimation*, Geophysics Prospect, vol. 57 pp. 253-262.), and for attenuation azimuth anisotropy (Clark R. A., Benson P. M., Carter A. J., and Guerrero Moreno C. A., 2009, *Anisotropic P-wave attenuation measured from a multi-azimuth surface seismic reflection survey*, Geophysics Prospect vol. 57 pp. 835-845; and Shekar B. and Tsvankin I., 2012, *Anisotropic attenuation analysis of crosshole data generated during hydraulic fracturing*, The Leading Edge vol. 31 pp. 588-593), also both using pre-stack seismic azimuth gathers are implemented to characterize the fractured reservoir parameters.

Nonetheless, hydrocarbon predictions from seismic amplitude and amplitude-versus-offset ("AVO") still remain a difficult task. An approach used by persons having ordinary skill in the art, is to use seismic reflections to closely relate them to subsurface rock properties. Yet, the strongest AVO in the seismic data is often caused by hydrocarbon saturation in the rocks. Advances on the use of prestack seismic inversion for extracting information in terms of subsurface elastic parameters for seismic data have tremendously helped in characterizing lithofacies and predicting reservoir properties with minimum error thereby reducing the number of dry wells and drilling risks in some basins of the world (See e.g. Russel, B., 2014, *Prestack seismic amplitude analysis: an integrated overview: Interpretation*, v. 2, no. 2, SC19-SC36). Such seismic models have been routinely applied for lithology prediction and fluid detection to identify potential targets for oil and gas exploration. Most recently, it has been widely used for estimating sweet spots in unconventional shale gas applications.

The essence of the seismic models are that the shear modulus of a rock does not change when the fluid saturation is changed. The bulk modulus in turn, changes significantly when the fluid saturation is changed. Since the shear modulus of the rock skeleton is equivalent to the shear modulus of the rock with pore fluid, the shear impedance can then be considered as a seismic attribute that mainly connects to the rock skeleton, whereas the acoustic impedance is dominated by both pore fluid and rock skeleton. As a result, the Poisson impedance can optimally eliminate the effect of rock skeleton in shear modulus from the one in acoustic impedance, which in return can produce better resolution of the fluid content. With seismic data, Poisson impedance is conventionally computed indirectly from P-wave, S-wave velocities and density which can be inverted from seismic data directly (See Goodway, supra). However, the indirect way of parameters estimation creates more uncertainties caused by the indirect calculation (See e.g. Zong, Z., X. Yin, and G. Wu, 2013, *Elastic impedance parameterization and inversion with Young's modulus and Poisson's ratio*, Geophysics, v. 78, no. 6, N35-N42). Wang, B., X. Yin, and F. Zhang, 2006, in their research paper *Lamé parameters inversion based on elastic impedance and its application: Applied Geophysics*, v. 3, pp. 120-123; compared the direct way to estimate the Lame parameters from prestack seismic data, to the indirect way of the Lame parameters estimation using the inverted P-wave and S-wave, but concluding that it still caused much more bias.

Thus, as a result of all these failed attempts to reduce the accumulative error, to provide accurate and reasonable results; direct and indirect extraction of fluid factors from seismic reflection data have gained much attention in recent years, especially given the wider availability and access to high performance computing systems, required to solve large scientific and engineer problems like the foregoing. Yet, none have proposed a unified, and consistent approach to solve these problems.

3. Fundamental Basis of Prestack Migration

Prestack Migration is a seismic data processing technique to map seismic events onto their appropriate positions (Sheriff, R. E., & Gerdart, L. P., 1995, *Exploration Seismology*, Cambridge University Press.). Prestack Migration is done either in time domain or depth domain, depending on the complexity of lithology. Prestack Time migration yields an inaccurate image in the presence of strong lateral velocity variation associated with complex overburden structure. In such cases, earth imaging is done by depth migration instead. Strong lateral velocity variation causes significant ray bending at layer boundaries, it gives rise to non-hyperbolic behavior of reflection times on common midpoint (CMP) gathers. As a result, amplitudes and travel times associated with the reflection events with non-hyperbolic moveout are distorted during conventional CMP stacking which is based on the hyperbolic moveout assumption. This causes CMP stack to depart from an ideal zero offset wave field. Therefore, when depth migration is needed, in principle, it is done before stack and not after stack (Yilmaz, Oz, 2001, *Seismic Data Analysis*, Society of Exploration Geophysicist). In most of these cases, Reverse Time Migration (RTM) is performed, as it is a pre-stack two-way wave-equation migration algorithm-solution suited for imaging in areas of complex structure, being able to handle steep structural dips and high velocity contrasts.

The first step in prestack depth migration is to choose an interval velocity depth model. The quality of the depth image depends heavily on the input data, the inversion algorithm, and a chosen class of models (number of reflection interfaces, parameterization for interfaces, geometry, and velocities within the layers, etc.). Both time and depth migration use a diffraction term for collapsing energy along a diffraction hyperbola to its apex, only the depth migration algorithms implement the additional thin-lens term that explicitly account for lateral velocity variation. The general workflow used by one of ordinary skills in the art, for pre stack depth migration is as given below:

1) Stacking velocity analysis along time horizons;
2) Root-mean-square (RMS) velocity analysis along time migrated horizons;
3) Stacking velocity refinement along time horizons;
4) RMS velocity refinement along time migrated horizons;
5) Interval velocity and depth model creation (coherency inversion); and
6) Interval velocity and depth model refinement and modelling (tomography).

Nevertheless, because the geometry of acquisition in complex geological situations with rough topography is seldom regular, a Kirchhoff prestack depth migration seems to be the method of choice. The particular Kirchhoff integral that is used for data extrapolation and migration (See for instance, Schneider, William A., 1978, *Integral Formulation for Migration in two and three dimensions*, Geophysics vol. 43 pp. 49-76; and Belistein, N. and S. H. Gray, 2001, *From the Hagedoorn imaging technique to Kirchhoff migration and inversion*, Geophysical Prospecting, vol. 49, pp. 629-645) is based on Green's theorem (Morese, Philip M. and Feshbach, Herman, 1953, *Methods of theoretical physics*, International Series in Puer and Applied Physics, pp. 791-869) and an integral solution of the wave equation, with 3D prestack seismic data recorded on separate sets of surface points. In practice the approximate Kirchhoff integral is (Sava, Paul and Biondi, Biondo, 2004, *Wave-equation migration velocity analysis—I: Theory*, Geophysical Prospecting, Stanford Exploration Project, Stanford University), given by:

$$I(r) \approx \Sigma_{i \in A_r} W_i(r,m,h) D[t_D(r,m,h), m_i, h_i] \qquad (1)$$

where the image I(r), is defined in a three-dimensional space r=(x,y,z), and is equal to the summation of data values D(r,m,h) evaluated at the time $t_D$(r,m,h) and weighted by an appropriate factor W (r,m,h) for amplitude. $m_i$ and $h_i$ are midpoint and offset positions.

Equation (1) is numerically computed as a loop over each image point I(r) and sums the contributions of all input traces that are within the migration aperture. Kirchhoff prestack depth migration uses the actual ray-path from every point-source to every receiving-sensor. This ray-path is used to construct the diffraction surface. The migration of a seismic section is achieved by collapsing each diffraction hyperbola to its origin (apex). In practice, each offset plane is first migrated separately and then, all offsets are summed together to generate the stacked migrated image. Therefore, the Kirchhoff prestack depth migration is performed in two steps. First summing data points with equal offsets, and then summing along offsets.

Because of its flexibility, the aforementioned Kirchhoff prestack depth migration (PSDM) is one of the most commonly used tools for processing seismic data. CPU-based PSDM have been used in the art, especially on CPU-clusters. Some algorithms, like Reverse Time Migration (RTM), run preferentially on Graphics Processing Units (GPU) based clusters (Xinyi Sun and Sang Suh, 2011, *Maximizing throughput for high performance TTI-RTM: From CPU-RTM to GPU-RTM*, SEG Technical Program Expanded Abstracts, pp. 3179-3183), and as such require a complex structure of computer systems typically comprising of input devices, memory resources, non-transitory program storage computer-readable memory encoded for computing an array of sub-process or sub-routines, a system computer, a computer system, and output devices. Investing in GPU-based clusters, means more software needs to be efficiently converted in order to maximize hardware utilization and also decrease seismic processing costs. Kirchhoff PSDM seems to be a prime candidate for such a conversion.

Compared to current CPU, GPU have a lot more cores. Unfortunately, to leverage this parallelism, an existing CPU-only-code needs to be modified. These changes are not straightforward, and they require more knowledge about the architecture of GPU hardware than when implementing a CPU-only software. Some of the main requirements for good performance are memory alignment and access patterns like Compute Unified Device Architecture (CUDA) programming. Nonetheless, to date, most of the articles about porting Kirchhoff migration algorithms to GPU are in time domain (See Panetta, Jairo & Teixeira, Thiago & Filho, P. R. P. & Finho, C. A. & Sotelo, David & Roxo, Fernando & Pinheiro, S. S. & Pedrosa, I. & Rosa, A. L. R. & Monnerat, Luiz & Carneiro, L. T. & Albrecht, C. H. B., 2009, *Accelerating Kirchhoff Migration by CPU and GPU Cooperation*, pp. 26-32, 10.1109/SBAC-PAD.2009.29.; and Brouwer W., Natoli, V., and Lamont, M., 2011, *A novel GPGPU approach to Kirchhoff Time Migration*, SEG Technical Program Expanded Abstracts, pp. 3465-3469), which embodiments of the present invention solve.

4. Tomography Inversion

Tomography of depth migrated gathers is a method for refining the velocity-depth model. Tomography is based on the principle that if migration is carried out, with a correct velocity depth model, the image gathers should have an event depth equal at all receiving sensors (Tian-wen Lo and Philip Inder Weisen, 1994, Fundamentals of seismic Tomography, SEG monograph series). Therefore, tomography attempts to correct errors in the velocity depth model by analyzing the residual delays after PSDM. When prestack depth migration is performed with an initial incorrect velocity model derived from inversion methods based on non-global approaches, the depth gathers will exhibit non-flatness. The degree of non-flatness is a measurement of the error in the model. Tomography uses this measurement of non-flatness (residual moveout analysis) as input and attempts to find an alternative model, which will minimize the errors. The tomographic principle attributes an error in time to an error in both, velocity and depth.

Yet, in the field of inverse theory, an object is described based on measurements or observations that are associated with that object. For industrial-scale applications, there is insufficient data to determine a unique solution and the data obtained may be noisy and/or unreliable. Consequently, an entire branch of mathematics has evolved with attempts to estimate a solution based on the interpretation of inaccurate, insufficient, and inconsistent data. In the case of travel time measurements made in seismic experiment, the inverse problem that is trying to get solved, is the velocity structure of the earth.

When merging the concept of tomography to inversion for multi-dimensional structures, one can observe that it has been utilized in oil field explorations since the late 1970's. However, the resolution for such inversions is typically in kilometers or even tens of kilometers. Details pertaining to the complex systems of oil field explorations cannot be resolved due to thousands of nodes incorporated into the models, so a 3D imaging that is still based on centralized off-line processing and is typically accomplished by multiple active-source recordings where variations over multiple year spans are the main goal. To achieve this, new schemes and methodologies are required to solve the real-time seismic tomography inversion problems, that cannot be achieved using single computational algorithms. This is one motivation for developing computer-implemented method that can relay an accurate imaging systems and models.

Because tomography is based on ray tracing, it can be formulated for reflection, transmission, and refraction. Several techniques for computing statics corrections in seismic reflection surveys make use of refraction tomography, whilst transmission tomography is used for cross-well applications where both the source and the receiver are inside the medium (within the boreholes); hence there is access to any transmitted arrival information. Exploiting amplitude information in addition to arrival times can further assist ray-based tomography in estimating a reliable velocity model (See for instance, Semtchenok N M, Popov M M, Verdel A R, 2009, *Gaussian beam tomography*, Extended Abstracts, 71st EAGE Conference & Exhibition, Amsterdam, U032). In addition to velocity estimation, tomography can be used to estimate other earth parameters, such as absorption. Further, tomography tries to solve a set of simultaneous equations using many ray-paths traversing the cells in the model. For a common-midpoint (CMP) gather, there are many travel time measurements for a given subsurface reflector element so the travel time expression for these five ray-paths can be written as:

$$T = D * S \qquad (2)$$

where T is the total travel time along the ray-path, D is the length of the ray-path in the cell of the velocity, and S is the slowness (i.e., the reciprocal of velocity) also in the cell of the velocity.

Unfortunately, in most cases, the matrix D is not invertible. To be invertible, it needs to be squared (i.e., the number of travel time measurements must just happen to be the same as the number of velocity cells in the model) and also to fulfil some other criteria. So, instead, the algorithm is then inverted into the time delay and the slowness update resulting in expression:

$$\Delta t = D * \Delta s \qquad (3)$$

However, there is a bit of a circular argument in the above description of the method because to estimate the ray-path segment lengths in the cells by ray tracing, a slowness update and the local dip estimates of the reflector segments in each cell are needed. Hence when a method is initiated with forward modeling by ray tracing an initial guess of the model and the associated travel times computed, a first-guess or estimate model is generated. The tomography must then be iterated to converge on the best estimate of the true model, by minimizing the differences between the observed travel times and those computed by ray tracing for the current guess of the model. Having said that, one skilled in the art would realize that there are other ways of solving for algorithm (2), such as: a direct solver, which is a one-step solution but only suitable for smaller scale problems; or an iterative solver, such as the conjugate gradient method (Scales, J. A., 1987, Tomographic inversion via the conjugate gradient method, Geophysics, vol. 52, pp. 179-85), which works well on large-scale systems.

The procedure described so far for tomography inversion, was cast in terms of observed and ray-traced travel times from unmigrated data. Over the past decade however, one skilled in the art has dealt primarily with data and measurements in the depth migrated domain, so there had also been a need to modify the tomography algorithms to account for the change of measurement domain. As such, tomography inversion in the migrated domain can be performed after either prestack time migration (See as an example Pierre Hardy and Jean-Paul Jeannot, 1999, 3-D reflection tomography in time-migrated space, SEG Technical Program Expanded Abstracts, pp. 1287-1290) or prestack depth migration (e.g., Christof Stork, 1992, Reflection tomography in the post-migrated domain, Geophysics vol. 57, pp. 680-692.), yielding a depth model in both cases, but the most widespread industrial practice is to invert using measurements from prestack depth migrated data. Which again, when either of these models are used independently, they account for less than useful lithology identification for one skilled in the art.

5. Optic Flow Estimation

Optic flow measurement is an early processing step in computer vision systems, that is used in a wide variety of applications, ranging from three-dimensional scene analysis to video compression. This processing step was first described by Horn and Schunck (See B. K. P. Horn and B. G. Schunck, Determining optical flow, Technical Report A. I. Memo 572, Massachusetts Institute of Technology, 1980), who devised a simple way to compute the optic flow based on regularization. This first work was then followed by a great number of contributions that proposed alternative methods like: (a) the spatiotemporal filtering methods (See E. H. Adelson and J. R. Bergen, Spatiotemporal energy models for the perception of vision, J. Opt. Soc. Amer., A2:284-299, 1985); (b) the split in energy based method (See D. J. Heeger, Optical flow using spatiotemporal filters, International Journal for Computer Vision, 1:279-302, 1988); (c) the phase based methods (See D. J. Fleet and A. D. Jepson, Computation of component image velocity from local phase information, International Journal of Computer Vision, 5:77-104, 1990); and (d) the region matching methods (See as e.g. P. J. Burt, C. Yen, and X. Xu, *Multiresolution flow-through motion analysis*, In Proc. Conference Computer Vision and Pattern Recognition, pages 246-252, Washington, 1983).

Many authors noticed that a good way to enhance the reliability of optic flow estimation was to perform a multi-scale computation, thereby using properties from one level, and models from different levels. The multi-scale approach proved to be very powerful, as in matching methods, it greatly reduced the dimension of the search space. In filtering based methods on the other hand, it increased the range of measurable displacement magnitudes, and relaxed the need for an a priori tuned frequency or scale parameter. This work was motivated by the observation that wavelets are a very well-designed tool for optic flow measurement. Because of their multiscale structure, and because large scale filtering can be performed efficiently with the fast wavelet transform, they are a very natural tool to measure optic flow: the projection of the optic flow equation onto the wavelets yields a very fast variant of massive filtering.

As an image sequence is a real function $l(t; x_1, x_2)$ of three variables t; $x_1$, and $x_2$ that it is supposed to be continuous in this first section, the concise notations x for $(x_1, x_1)$ and x(t) for $[x_1(t), x_2(t)]$ are used. The standard mathematical model used to find the optic flow is mostly based on a constant brightness assumption: a real point $[X_1(t), X_2(t), X_3(t)]$ in the scene is projected onto the image plane to an image point $[x_1(t), x_2(t)]$.

$$[X_1(t),X_2(t),X_3(t)] \to [x_1(t),x_2(t)] \text{ at time } t \qquad (4)$$

The optic flow at time t and location x(t) is defined as the velocity of the image point:

$$v = (v1,\ v2) = \left(\frac{dx_1}{dt}, \frac{dx_2}{dt}\right) \qquad (5)$$

The brightness constancy assumption consists in saying that the brightness of $[x_1(t),x_2(t)]$ at time t is time independent, hence:

$$I[t;x(t)] = I_0 \qquad (6)$$

The optic flow v is therefore constrained by the following equation:

$$\frac{\partial I}{\partial t} + \nabla I \cdot \frac{dx}{dt} = 0 \qquad (7)$$

or $$v \cdot \nabla I + \frac{\partial I}{\partial t} = 0 \qquad (8)$$

The variant from equation (8) can be further defined to take the possible illumination changes into account using a Lambertian surface aspect model:

$$I(t;x1,x2) = R(t;x1,x2) * L(t;x1,x2) \qquad (9)$$

In equation (9), R is the reflectance, or a picture sequence fulfilling the brightness constancy assumption. L is the illumination factor that accounts for brightness changes. For a single light source at finite distance, L is a product:

$$L(t; x1, x2) = \frac{L_0}{d^2} \cos i \qquad (10)$$

where i is the angle of incidence of the source light falling on the object, and d is the distance between the source and the object.

Although changes in illumination are caused by relative moves between the light source and the object, one skilled in the art would assume that these changes have slow variations in space. This consists in assuming that the spatial derivatives $$\frac{\partial L}{\partial x} \text{ and } \frac{\partial L}{\partial x}$$

are negligible. By differentiation, the equation ends up being:

$$\frac{dI}{dt} = \frac{dR}{dt}L + R\frac{\partial L}{\partial t}\partial L\partial t = 0 + R\frac{\partial \log L}{\partial t}L \quad (11)$$

and a modified optic flow equation taking illumination changes into account:

$$\frac{\partial I}{\partial x_1}v_1 + \frac{\partial I}{\partial x_2}v_2 + \frac{\partial I}{\partial t} = \frac{L'}{L}I \quad (12)$$

The parameters that can then be estimated from this constraint are the optic flow $v=(v1, v2)$ and the time derivative of log $$L : \frac{L'}{L}.$$

Note mat L cannot be measured more accurately than up to a multiplicative constant, since a pattern $\alpha \times P$ and an illumination $\alpha^{-1} \times L$ gives the same sequence I and thus the same constraints. This is reflected in the fact that that the time derivative of log L is not affected by a multiplication of L with a constant factor.

The problem of optic flow measurement has infinitely many solutions and is by essence ill-posed. The only way to reduce the number of solutions is to compute additional assumptions and apply it directly to a particular model. This rule applies in all optic flow measurement techniques and no method makes an exception to it.

6. Semblance Analysis

Building subsurface velocity model is one of the most important issue in exploration geophysics. There are generally four ways for building the velocity model. One of those four ways is by employing a normal-moveout (NMO) based velocity analysis, which requires selecting peaks in the velocity spectra (See Taner, M. T., and F. Koehler, 1969, *Velocity spectra—Digital computer derivation and applications of velocity functions*: Geophysics, 34, 859-881; Fomel, S., 2009, *Velocity analysis using AB semblance*: Geophysical Prospecting, 57, no. 3, 311-321; Luo, S., and D. Hale, 2012, *Velocity analysis using weighted semblance*: Geophysics, 77, no. 2, U15-U22), which in turn is obtained by applying several NMOs with different velocities and then calculating their corresponding semblances. As it can observed, using semblance measures is an indispensable step for building an initial subsurface velocity model. Nevertheless, there exist several types of semblance methods, depending upon the specific datasets that is used. A person having ordinary skills in the art will recognize that the most commonly used semblance method, uses a conventional approach.

The conventional semblance approach was originally defined by Neidell and Taner in 1971 (See Neidell, N. S., and M. T. Taner, 1971, *Semblance and other coherency measures for multichannel data*: Geophysics, vol. 36, pp. 482-497,) as:

$$s(i) = \frac{\sum_{j=i-M}^{i+M}\left(\sum_{k=0}^{N-1}a[j,k]\right)^2}{N\sum_{j=i-M}^{i+M}\sum_{k=0}^{N-1}a^2(j,k)} \quad (13)$$

where i and j are time sample indices, s(i) denotes the semblance for time index i, 2M+1 is the length of the smoothing window (in this formulation a boxcar filter is used), along time axis, and a(j,k) is the trace amplitude at time index j and trace number k of the NMO-corrected common midpoint (CMP) gather.

Others have developed variations off the conventional semblance approach, as observed in Sarkar, D., J. P. Castagna, and W. Lamb, 2001, *AVO and velocity analysis*: Geophysics, vol. 66, pp. 1284-1293; and Fomel, S.; and E. Landa, 2014, *Structural uncertainty of time-migrated seismic images*: Journal of Applied Geophysics, vol. 101, pp. 27-30), that modified the conventional semblance formulation and proposed amplitude-versus-offset (AVO) adaptive semblances. Similarly, Luo and Hale, supra, proposed increasing the resolution of the semblance map in order to distinguish the peaks between primary and multiple reflections. They did this, among other things to increase the resolution of the semblance spectra for picking the true NMO velocity, due to the existence of multiples common midpoint (CMP) gathers (Luo and Hale, supra).

7. Trimming Statics

Data-smoothing statics methods assume that patterns of irregularity which events have in common, result from near-surface variations and hence static-correction trace shifts should minimize such irregularities. Most automatic statics-determination programs employ statistical methods to achieve the minimization. Data-smoothing methods are generally applied to remove small residual errors after first applying other methods. These second-order statics correction methods are often called trim statics (See for instance Cox, Mike, 1999, *Static Corrections for Seismic Reflection Surveys*: Society of Exploration Geophysicists).

Several geophysical software packages for performing trim statics are known in the art. Examples of such products are available from companies like Hampson-Russell. According to these known computer-implemented techniques, the trim static process they provide, can fix migration move-out problems on pre-stack data by adjusting the time an event occurs through user-defined controlled parameters. The software thereby automatically flattens the far offsets, yet still providing geophysicists full control and understanding of the conditioning processes applied, therefore giving persons skilled in the art, greater confidence in the results of the subsequent reservoir characterization.

Regardless of the software package use, when trimming statics, the summing of traces in a common midpoint (CMP)

gather assumes that the reflection data is aligned, and the amplitude will increase with the fold or number of traces in the gather. As such, noise will also sum, but its root mean square (RMS) amplitude will increase with the square-root of the fold. The corresponding gain in the signal-to-noise ratio (SNR) will be proportional to the square root of the fold. It may be assumed then, that a high fold will give a better SNR. However, when the reflection data is misaligned, the amplitudes will not increase proportional to the fold, and a lower SNR may be obtained. There the objective of estimating statics is to align the reflection data to improve the SNR of the stacked section. However, the application of trim statics directly to each seismic trace can be very dangerous as any seismic response can be generated. Nonetheless, corrections are applied to seismic data to compensate for the effects of variations in elevation, near-surface low velocity-layer (weathering) thickness, weathering velocity and/or reference to a datum.

Statics are estimated from the time shift found by cross-correlating input data with a model trace. This time shift may be applied to the source trace when the time shifts are very small, say less than 6 ms, and is referred to as trim statics. However, the initial estimate of the cross-correlation static is typically used as input to a secondary surface-consistent process. This secondary process decomposes all the estimated statics into source, receiver, offset, and structure statics, with only the corresponding source and receiver statics applied to an input trace. This secondary process is designed to reduce the timing errors that will occur if the correlation static is applied directly to the input trace.

When trim statics are applied to noisy data, the noise may be aligned with the model trace. The sum of a number of traces in a common midpoint (CMP) gather, in which trim statics have been applied, will therefore produce a stacked trace that tends to be similar to the model trace. Consequently, the resulting stacked section may also appear similar to the model trace giving the illusion of reflection data.

8. Flattening Algorithm

To flatten an image gather, each image gather is shifted vertically to match a chosen reference point. A reference point can be the intersection of the horizon and a well pick. In three dimensions, this reference point becomes a vertical line or seismic trace reference. To flatten 3D cubes, it has been the study of individuals skilled in the art the need to find a mapping field T(x,y,t) such that each time slice of this field contains the locations of all data points along the horizon that happens to intersect the reference trace at that time slice. This is achieved by summing time shifts or depth dips to get total time shifts which are then used to flatten the data.

Clearly then, the first step in achieving a flattened image gather is to calculate local dips everywhere in the 3D seismic cube. Dips can be calculated efficiently using a local plane-wave destructor filter as described by Claerbout (see Claerbout, J. F., 1992, *Earth soundings analysis: Processing versus inversion*; Blackwell Scientific Publications) or with an improved dip estimator described by Fomel (see Fomel, S., 2002, Applications of plane-wave destruction filters; Geophysics, vol. 67, pp. 1946-1960). For each point in the data cube, two components of dip, b and q, are estimated in the x- and y-directions, respectively. These can be represented everywhere on the mesh as b(x,y,t) and q(x,y,t). If the data to be flattened are in depth, then dip is dimensionless, but when the data are in time, dip has units of time over distance. Therefore, the goal then turns towards finding a time-shift (or depth-shift) field τ(x,y,t) such that its gradient approximates the dip p(x, y, τ). The dip is a function of T because for any given horizon, the appropriate dips to be summed are the dips along the horizon itself. Using the matrix representation of the gradient operator $$\nabla = \left[\frac{\delta}{\delta x} \frac{\delta}{\delta y}\right]^T$$

and the estimated dip p=(b q)$^T$, the regression turns to ∇T=(x,y,t)=p(x,y,τ) but because it is a function of the unknown τ(x,y,t) and Gauss-Newton iterating approach is utilized to achieve the following equation for flattening image gathers:

$$r=w[\nabla\tau_k(x,y,t)-p(x,y,T_k) \qquad (14)$$

9. Slant Stacking Algorithm Processing

Plane-wave decomposition of a wavefield, such as a common-shot gather, can be achieved by applying linear moveout and summing amplitudes over the offset axis. This procedure is called slant stacking. An underlying assumption of slant stacking is that of a horizontally layered earth model. Conventional processing is done primarily in midpoint-offset coordinates. Slant stacking replaces the offset axis with the ray parameter p-axis. The ray parameter is the inverse of the horizontal phase velocity. A group of traces with a range of p values is called a slant-stack gather.

The slant stacking algorithm can be traced back to the Radon transformation concept (See Radon, Johann (1917), "Ober die Bestimmung von Funktionen durch ihre Integralwerte langs gewisser Mannigfaltigkeiten", Berichte Ober die Verhandlungen der Koniglich-Sächsischen Akademie der Wissenschaften zu Leipzig, Mathematisch-Physische Klasse [/Reports on the proceedings of the Royal Saxonian Academy of S7ciences at Leipzig, mathematical and physical section], Leipzig: Teubner (69): 262-277; Translation: Radon, J.; Parks, P. C. (translator) (1986), "On the determination of functions from their integral values along certain manifolds", IEEE Transactions on Medical Imaging, 5 (4): 170-176, doi:10.1109/TMI.1986.4307775, PMID 18244009). In general, a slant stacking algorithm comprises transforming the offset axis, as part of a migration method. It extracts a local step-out or ray parameter in the form of $$p = \frac{dt}{dx}$$

(where x is the offset, and t is the two-way travel-time) and enables immediate downward continuation, even when mixed apparent velocities are present as with diffractions, and multiple reflections.

When looking at gathers for events of some particular step-out, $$p = \frac{dt}{dx},$$

it involves scanning hyperbolic events to find the places that are tangent to a straight line of slope p. The search and analysis becomes easier when the data is replotted with linear moveout analysis, which involves a source of energy located at offset x=g−s at time t in the (x,t)-plane "movedout" to time τ=t−px in the (x, τ)-plane (wherein τ is the intercept time at p=0). The linear moveout analysis converts the task of identifying tangencies to constructed parallel lines to the task of locating the tops of convex events. As such, it converts all events stepping out at a rate p in (x,t)-space, to horizontal' events in (x,τ)-space. The presence of horizontal timing lines facilitates the search for and the identification and measurement of the locations of the events.

After the linear moveout analysis has been performed, the components in the data that have Snell parameters near p are slowly variable along the x'-axis. To extract them, a low-pass filter is applied on the x'-axis, and done so for each value of T. The limiting case of low-frequency filtering extracts the mean, which leads to the concept of slant stacking. The slant stacking algorithm, then processes the linear moveout, with the x'-axis, converting the entire gather of P(x,t) to a single trace that is a function of T, represented in the form of:

$$S(p,\tau)=\Sigma_x P(x,\tau+px) \quad (15)$$

where, $S(p,\tau)$ represents a plane wave with ray parameter $$p = \frac{\sin\theta}{v}.$$

By repeating the linear moveout correction for a range of p values and performing the summation in equation (15), a complete slant-stack gather is constructed. A slant-stack gather, in practice, alternatively is referred to as a τ−p gather; it consists of all the dip components within the specified range of p values in the original offset data.

To restore amplitudes properly, rho filtering is applied before inverse mapping. This is accomplished by multiplying the amplitude spectrum of each slant-stack trace by the absolute value of the frequency. Rho filtering is equivalent to differentiating the wavefield before the summation that is involved in the integral formulation of migration (migration principles).

A conventional slant stack yields an exact plane-wave decomposition when dealing with line sources; a slant stack algorithm in contrast, yields an exact plane-wave decomposition when dealing with point sources. A proper slant stack is generated using the same steps as described for the slant stack algorithm, except that a convolution of the linear moveout-applied wavefield by a filter operator is performed before summation. This operator corrects for 3-D effects by converting a wavefield that was obtained from a point source into a wavefield that was obtained from a line source. As far as kinematics is concerned, the two types of slant stacking are equivalent, yet only compatible to specific circumstances. This is because the slant-stacking can satisfy a one-dimensional wave equation in a laterally homogeneous model, which will depend on reflection coefficients for one ray parameter, a two-dimensional problem, or a three-dimensional problem with a line source.

Hence the reason why the analysis of seismic reflection and refraction data using the process of slant stacking has recently received much attention, and requires a faster way of analyzing, processing and computing that can only be achieved with the use of computer systems.

10. Methodology for Cave Recognition

Explored caves are only a limited portion of those actually existing underground (See White, W. B., 1990; *Surface and near-surface karst landforms*, in Higgins, C. G., and Coates, D. R., eds., *Groundwater Geomorphology: The Role of Subsurface Water in Earth-Surface Processes and Landforms*; Geological Society of America Special Paper vol. 252, pp. 157-175; and Ford, D. C., and Williams, P., 2007; *Karst Hydrogeology and Geomorphology: Chichester*, John Wiley & Sons Inc.; p. 576). To obtain information about those hidden caves, or unknown or inaccessible continuations of known caves, a person skilled in the art must use a combination of methods (Parise, M., and Lollino, P., 2011; *A preliminary analysis of failure mechanisms in karst and man-made underground caves in Southern Italy*; Geomorphology, v. 134, no. 1-2, p. 132-143; Margiotta, S., Negri, S., Parise, M., and Valloni, R., 2012; *Mapping the susceptibility to sinkholes in coastal areas, based on stratigraphy, geomorphology and geophysics*; Natural Hazards, vol. 62, no. 2; and Pepe, P., Pentimone, N., Garziano, G., Martimucci, V., and Parise, M., 2013; *Lessons learned from occurrence of sinkholes related to manmade cavities in a town of southern Italy, in Land*; Proceedings of the 13th Multidisciplinary Conference on Sinkholes and the Engineering and Environmental Impacts of Karst, Carlsbad (New Mexico, USA), National Cave and Karst Research Institute; pp. 393-401). As such, near surface geophysical methods have recently become an important tool in karst-caves research.

The idea behind most of said geophysical methods focuses on a material property of the void that is significantly different from the surrounding host rock and thus makes a material contrast. This material contrast can then be detected using a specific geophysical techniques (See for example Gibson, P. J., Lyle, P., and George, D. M., 2004; *Application of resistivity and magnetometry geophysical techniques for near-surface investigations in karstic terranes in Ireland*; Journal of Cave and Karst Studies, v. 66, no. 2, p. 35-38; Mochales, T., Casas, A. M., Pueyo, E. L., Pueyo, O., Roman, M. T., Pocovi, A., Soriano, M. A., and Anson, D.; 2008; *Detection of underground cavities by combining gravity, magnetic and ground penetrating radar surveys: A case study from the Zaragoza area, NE Spain*; Environmental Geology, v. 53, p. 1067-1077; or Margiotta, S., and Varola, A., 2007, *Il paleosito di Cutrofiano (Salento), proposta per l'istituzione di un parco—museo*; Atti della Societa' Toscana Di Scienze naturali—Memorie. Serie A 112,1-8). Among some of the most frequently used geophysical techniques, a person skilled in the art would recognize as: electrical-resistivity tomography and microgravity can be mentioned, albeit additional methods can provide very useful information as well which none have been tried.

One of those methods seems to be seismic amplitude-versus angle (AVA) or amplitude versus offset (AVO) analysis. These techniques which geophysicists use to determine mainly the formation properties, such as the thickness, porosity, density, velocity, lithology and fluid content of rocks. As such, it has been a powerful geophysical method in aiding the direct detection the presence of hydrocarbons.

Persons of ordinary skill in the art, will recognize that the angle in AVA analysis refers to the incidence angle θ, or half of the opening angle between the source and receiver wave-fields. For an isotropic elastic medium, the P-wave reflectivity varies approximately linearly with respect to $\sin^2\theta$, such relationship is called the 2-term Shuey's approximation—an approximation to the reflectivity versus incidence angle by Aki and Richards, 1980, and valid for small or medium angles below 30°:

$$R(\theta) \approx R_o + G\sin^2\theta, \quad (16)$$

$$R_o \approx \frac{1}{2}\left(\frac{\Delta V_P}{V_P} + \frac{\Delta\rho}{\rho}\right), G \approx \frac{1}{2}\frac{\Delta V_P}{V_P} - 2\frac{\Delta V_s^2}{V_P^2}\left(2\frac{\Delta V_s}{V_s} + \frac{\Delta\rho}{\rho}\right). \quad (17)$$

The first term $R_o$ is a linearized version of the zero angle/offset reflection coefficient and is a function of only P wave velocity $V_p$ and density $\rho$. The second term is a gradient multiplied by $\sin^2\theta$, it is dependent on changes in P wave velocity $V_p$, S-wave velocity $V_s$, and density $\rho$, and has the biggest effect on amplitude changes as a function of angle/offset. For a function with the variable of $\sin^2\theta$, equation (16) represents a linear equation with $R_o$ as intercept and G as gradient.

For an acoustic medium, the equation for G is $$G \approx \frac{1}{2}\frac{\Delta V_p}{V_p},$$

a function of P-wave velocity, $V_p$. Nevertheless, equations 16 and 17 are only valid for the reflection energy, when setting $V_s=0$, or when $$\frac{1}{2}\frac{|\Delta V_P|}{V_p} > 2\frac{\Delta V_s^2}{V_P^2}\left|\left(2\frac{\Delta V_s}{V_s} + \frac{\Delta\rho}{\rho}\right)\right|.$$

Other approaches that have been tried for cave detection using multiple geophysical algorithms have been successful only for caves within specific regions containing unique characteristics. Such has been the case of Kaufmann, Romanov and Nielbock in 2010 (see Kaufmann, G., Romanov, D., and Nielbock, R. (2011); "*Cave detection using multiple geophysical methods: Unicorn cave, Harz Mountains, Germany*"; GEOPHYSICS vol. 76; pp. B71-B77) where the focus of the research had been in the Unicorn cave in the Southern Harz Mountains of Germany. In particular, their research involved using the geophysics methods of gravimetry and electrical resistivity imaging over the cave area, merely to identify the subsurface voids and the extent of the sediment infill of the cave passages. Their choice of methods was based on several conditions unique to the cave which involved: (1) having the well surveyed, (2) a shallow overburden, (3) a large air-filled passage, and (4) a thick sediment cover that, concealed true passage size. Using the cave survey as an initial model for the subsurface structure, they successfully identified the air-filled cave with both methods, and then use it to infer the thickness of the sediment infill by forward modeling and thereby identifying a possible southward continuation beyond the currently explored passages.

Most recently another example of successful cave detection using complex geophysical methods were used by Ptiska, et. al., in 2014 (See Putiska, R., Kusnirak, D., Dostal, I., Lacny, A., Mojzes, A., Hok, R., Pasteka, M., Krajnak, M., and Bosansky, M.; 2014; *Integrated geophysical and geological investigations of karst structures in Komberek, Slovakia*; Journal of Cave and Karst Studies, v. 76, no. 3, p. 155-163). Their investigation was used over a small karst area aimed, solely to confirm geological localization of known sinkholes, and to find possible continuations of caves and voids below the surface. Using radiometric mapping and dipole electromagnetic profiling, supported by geological mapping, they were able to refine the geological boundaries of the lithological units, only within a certain karst area. Then using resistivity tomography and microgravity methods, a final geological cross-section model of the area was constructed. Yet the methods and evaluation techniques they used, were not successfully applied to other karst areas to identify hidden voids that possibly constitute karst hazards.

Therefore, each of the individually discussed methods, as well as the combination of the aforementioned methods as demonstrated, suffer from a wide array of limitations which makes it difficult to conduct reliable and accurate readings, and thereby limiting a person skilled in the art to properly assess low velocity, and density of subterranean caves. As such, in view of the known art, it is therefore seen as one object of the invention to improve and enhance known methods and systems for characterizing and recognizing subterranean caves using advanced computer-implemented systems, that can quickly, and accurate compute an array of functions, whilst providing the user of said computer-implemented systems, typically a person skilled in the art, with full control and understanding of the conditioning processes applied, thereby instilling greater confidence and less uncertainty in the results of the recognized cave, for a subsequent reservoir characterization over a survey region having at least one hydrocarbon well or reservoir location.

SUMMARY OF THE INVENTION

Typically, exploration and reservoir characterizations are performed over a region that is surveyed for its soil, and fluid potential properties. Depending upon the properties found in the survey region, one or various hydrocarbon reservoirs (i.e., oil and gas) may be established. Once these reservoirs, or wells, are established within the survey region computer-implemented methods are used for automating the interpretation of seismic results. Many of these computer-implemented methods are used independently by one skilled in the art because of their limitations to process a vast amount of data, perform distinct computational algorithms at the same time, or comprise of a single computer-implemented analytical approach in which depth-domain signals corresponding to the reflection of acoustic energy from reflective interfaces between subsurface strata in the earth are converted into one or more traces representative of physical attributes of the strata. Furthermore, these attributes are then analyzed offline by one skilled in the art, like geophysicists which in turn create a summary document in another existing computer-implemented program like word processors or spreadsheets.

In contrast, it is therefore an object of the embodiments of the present invention, to provide a single computer-implemented method for lithology identification and fluid discrimination, in the field of seismic exploration and reservoir characterization using an array of seismic reflection data, to successfully, efficiently, and accurately; identify the diffractions associated with small karst caves (size smaller than half seismic wavelength) with low velocity and density from reflection events of overburden and carbonate background layers.

Based on in-network tomography inversion, embodiments of methods and systems to improve the real-time performance of the distributed approach are described herein. The key challenge of real-time tomography inversion is to update the system model incrementally before all information of seismic events is available. In one aspect, distributed incremental least-squares algorithms can be used, in which history data are exponentially weighted according to oldness. In another aspect, use of a row action matrix method is described, which does not require the full design matrix to be in memory at one time. In fact, the approach of consecutive back projection can incorporate new information (ray-paths or rows), in real time. In this case, the model is constantly being updated by new information as fractures occur and are incorporated to the computer-implemented method via a high performance computer system apparatus that minimizes computational costs, a person skilled in the art subjectivity, and the need to further summarize any analysis. Therefore, this approach is ideal for real time inversion of an evolving structure where fractures can be dynamically included in the analysis.

Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

Figure 1:
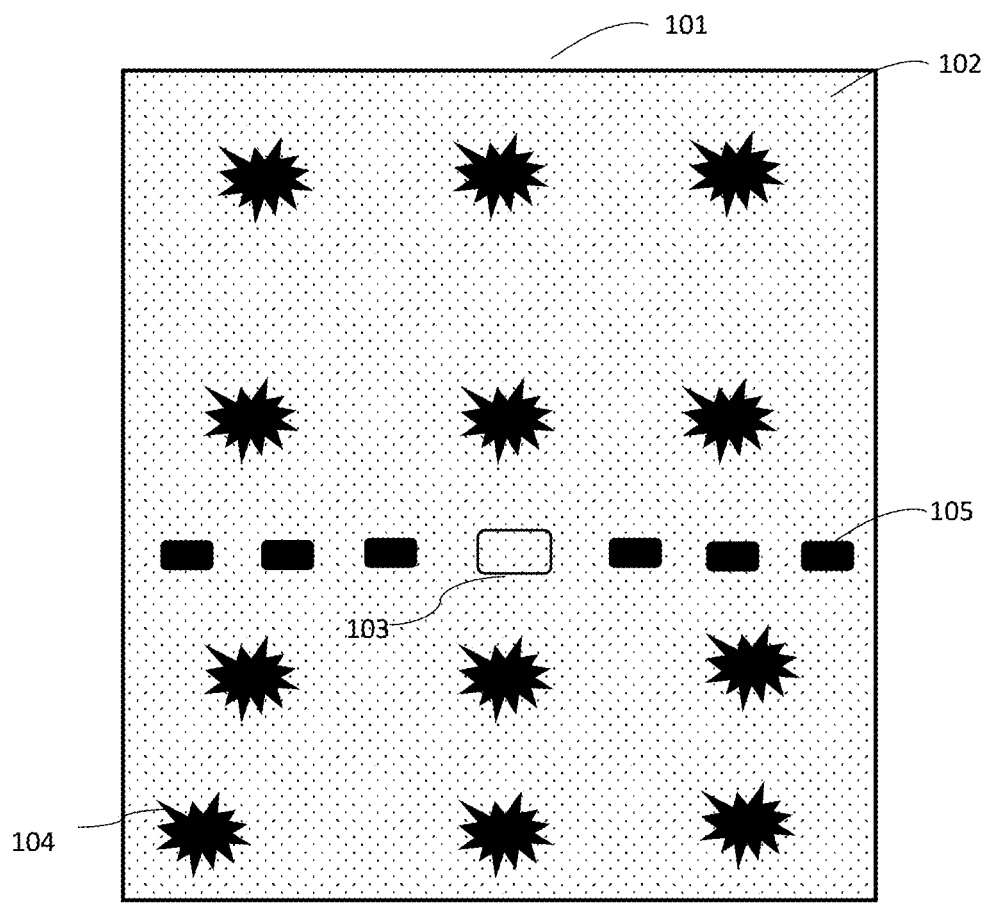
FIG. 1, is a schematic diagram showing a top view of a survey region with the various points of incidence of seismic sources according to an embodiment of the present disclosure.

FIG. 1 illustrates a seismic survey region, 101, a land-based region represented as 102, in which the preferred embodiment of the present invention is useful. Persons of ordinary skill in the art, will recognize that seismic survey regions produce detailed images of local geology in order to determine the location and size of possible hydrocarbon (oil and gas) reservoirs, and therefore a well location 103. In these survey regions, sound waves bounce off underground rock formations during blasts at various points of incidence 104, and the waves that reflect back to the surface are captured by seismic data recording sensors, 105, transmitted by data transmission systems, 402, wirelessly, 403, from said sensors, 105, then stored for later processing, and analysis by the computing system apparatus of FIG. 4.

Figure 2:
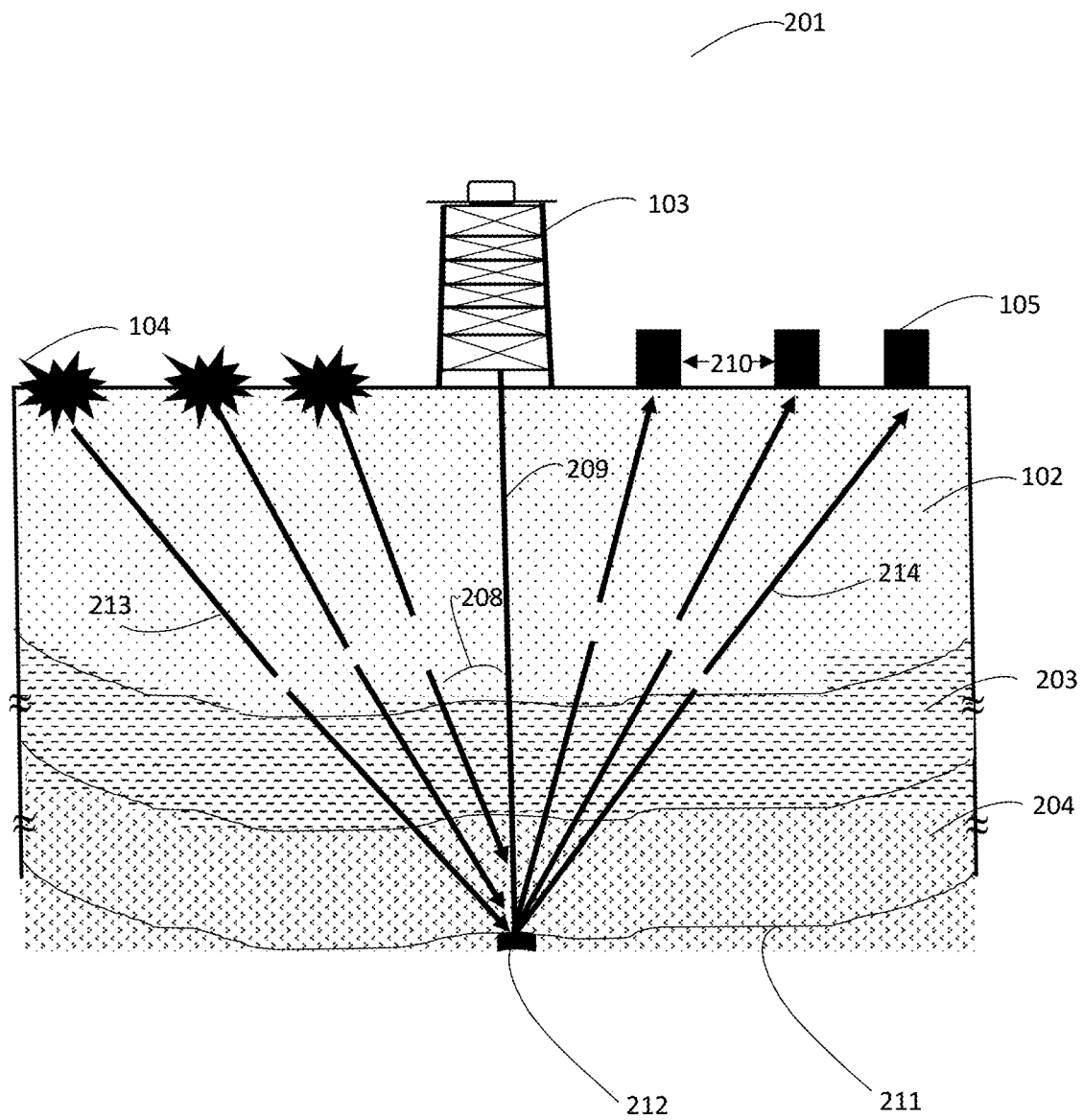
FIG. 2, is a schematic diagram showing a cross-sectional view of an illustrative environment with points of incidence of seismic sources, seismic receivers, a well location, a wellbore, a subterranean cave and/or cavern, a reflector area (e.g. a horizon or other reflector area), the various transmission traces, and the various angles of incidence, according to certain embodiments of the present disclosure.

In FIG. 2 a cross-sectional view of a portion of the earth over survey region 101, is illustrated as 201, showing different types of earth formation, 102, 203, 204, which will contain part of the seismic survey data used in the present invention. In particular, persons having ordinary skill in the art, will soon realize that the present example shows a common midpoint-style gather, where seismic data traces are sorted by surface geometry to approximate a single reflection point in the earth. In this example, data from several shots, 104, and receivers 105 may be combined into a single image gather, a common midpoint location, or used individually depending upon the type of analysis to be performed. The shots, 104, generate source-traces or source-wavefields, 213. Although the present example illustrates a cave or cavern, 212, a flat reflector (e.g. such as a horizon) 211, and their respective image gather class, other types or classes of image gathers known in the art maybe used, and its selection may depend upon the presence of various earth conditions or events.

As shown on FIG. 2, seismic energy from multiple points of incidence 104, will be reflected from the interface between the different earth formations 102, 203, 204 as well as cave, 212, and reflector, 211. These reflections, 214, depict seismic data and energy that emanates from the points of incidence, 104, that will then be captured by multiple seismic data recording sensors 105, each of which may be placed at different location offsets 210 from each other, and the well 103. By contrast, a person having ordinary skills in the art will recognize that individual source traces can emanate as well, from source 104 that impinges on cave 212 which is then diffracted by cave 212 into a plurality of receiver traces 214 that travel to receiving or recording sensor 105.

Because all points of incidences 104, and all seismic data recording sensors 105 are placed at different offsets 210, the survey seismic data or traces (213 incidence trace, and 214 receiver trace), also known in the art as gathers, will be recorded at various angles of incidence represented by 208. The points of incidence 104 generate downward transmission rays 213, in the earth that are captured by their upward transmission reflection 214, through the recording sensors 105. Well location 103, in this example, is illustrated with an existing drilled well attached to a wellbore, 209, along which multiple measurements are obtained using techniques known in the art. This wellbore 209, is used to obtain well log data, that includes P-wave velocity, S-wave velocity, Density, among others. Other sensors, not depicted in FIG. 2, are placed within the survey region to also capture horizons data information required for interpreters and persons of ordinary skilled in the art to perform various geophysical analysis. In the present example, the gathers will be sorted from field records in order to examine the dependence of amplitude, signal-to-noise, move-out, frequency content, phase, and other seismic attributes, on incidence angles 208, offset measurements 210, azimuth, and other geometric attributes that are important for data processing and imaging and known by persons having ordinary skills in the art. All of the data collected by the receiving sensors, 105, will be stored temporarily at location, and then transmitted by data transmission systems, 402, wirelessly, 403, from said sensors, 105, to the computing system apparatus of FIG. 4, for storage, processing, computing and analysis.

Figure 3:
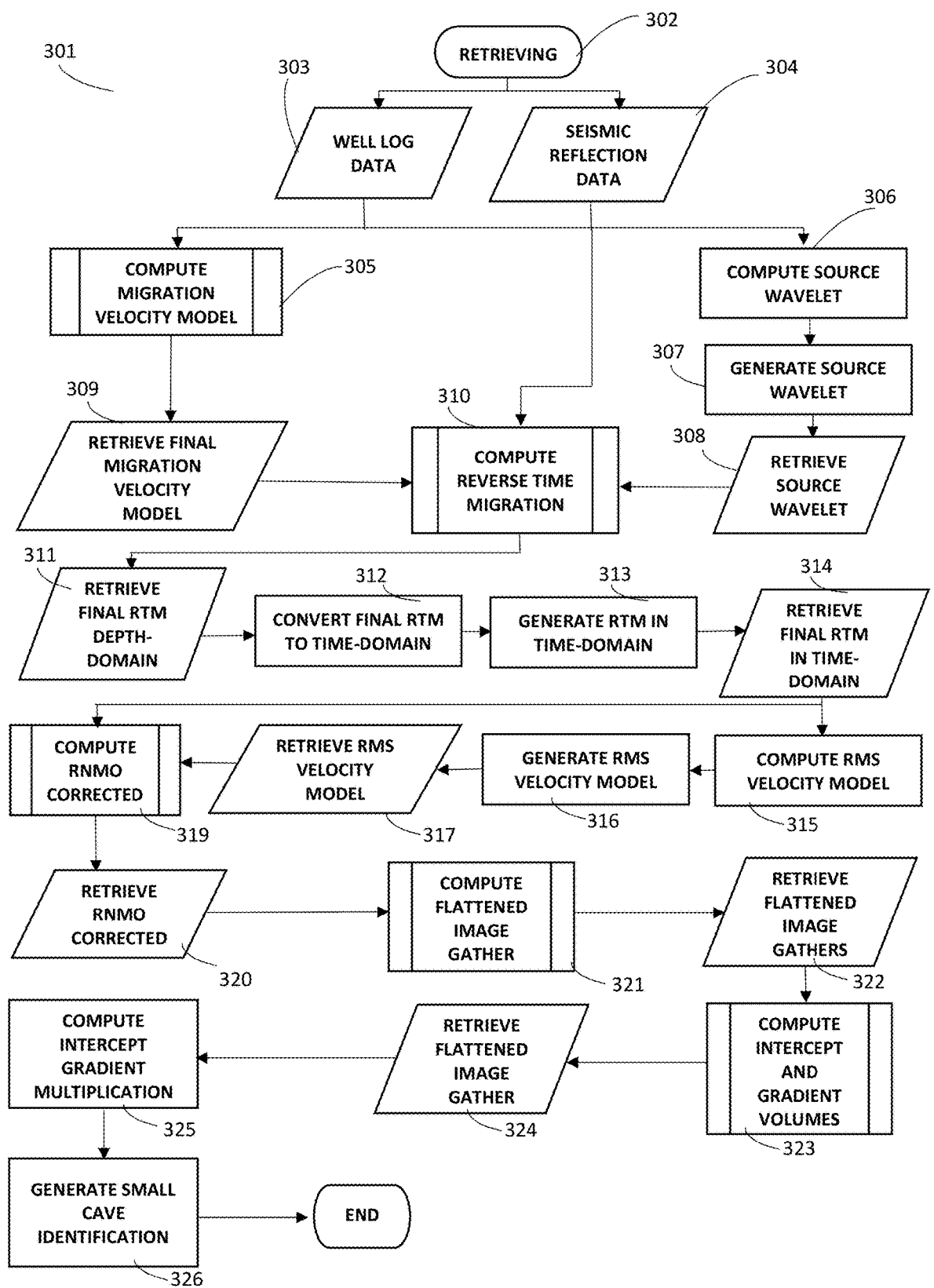
FIG. 3, is a flow chart showing the computer-implemented method for small cave recognition using seismic reflection data in a survey region, according to an embodiment of the present disclosure.

As shown in FIG. 3, the computer-implemented method, 301, initiates by retrieving, 302, from the memory resource, 404, that was acquired by the plurality of field receiving sensors, 105, located within a survey region, 101. The data acquired generally comprises of different types of inputs like: well log data represented in time domain 303, surface seismic reflection data represented in time-domain, 304, which further comprises of data from seismic traces, 214, source and receiver—wavefield information like image gathers, horizon information, and seismic velocity data. The well log data may be obtained directly from the well location and wirelessly transferred onto database 404, for further compilation, such as that contemplated on FIG. 4. It may also be retrieved from database 404, by system computer 405, and the non-transitory program computer readable memory device 406. For the present invention, the well log data may comprise of the P-wave velocity, S-wave velocity, and density over survey region, 101, but a person with ordinary skills in the art will realize that in the present embodiment other sets of data may also be collected and stored. Further, the set of angle image gathers comprise a plurality of image gathers, constant with the amount of points of incidence 104 within a survey region 101 represented in the time domain at the various angles of incidence 208. Nonetheless, since this seismic survey data 304 is too raw, noisy, or from various points of incidence 104, it needs to be further processed. This further refinement of the set of angle image gathers is sub-routine procedure 305 which, within the present computer-implement method is illustrated as FIG. 5a and FIG. 5b. Further, imaging complex structures inside the earth requires reasonable velocities that are provided by computing a migration velocity model, 305, based on the principle that the images in the migrated data will be distorted when an erroneous velocity is used, and the difference of the imaged depths (residual moveout) at a common image gather is a measure of the error in the velocity. This step is crucial for the computer-implemented method 301, as it requires that correct velocities accurately explain the relative time delays between reflection traces 214 that are originated from the same interface in the subsurface, but were reflected with different aperture angles, 208, at reflection points, like 211 and 212. Once sub-routine or independent process 305 is completed, a final migration velocity model is generated and stored to memory resource, 404.

System computer 405, retrieves in a parallel operation the seismic reflection data, 304 to compute a source wavelet, 306, which originated as a packet of energy from the source point, 104, having a specific origin in time, and returned to the receivers 105, as a series of events distributed in time and energy. An initial set of wavelets is extracted from the retrieved image gathers found in seismic reflection data 304, which acts as an initial estimate of what a final source wavelet should look like. The extraction is computed within the present invention, using statistical wavelet extraction procedures which uses the seismic traces alone, to extract the source wavelets 307. However, in order to extract each source wavelet, the corresponding trace in the set of image gathers is used, an analysis window is extracted, and the start and end of the extracted analysis window are tapered in lengths equal to the lesser of 10 samples, or ¼ of the analysis window. An autocorrelation process is computed in a data window, wherein the length of the autocorrelation is equal to ½ of the desire wavelength. The amplitude spectrum of the autocorrelation is computed, and the square root of the autocorrelation is computed, by system computer 405 in order to compute the source wavelet 306. This operation is performed to approximate the amplitude spectrum of the source wavelet to be generated at 307. Thereafter, the desired phase (e.g. 0°, 5°, 10°, 15°, etc.) is added, and the inverse Fast Fourier Transform (FFT) is computed by system computer 405, to generate or extract at 307 the initial source wavelet and store it at memory resource 404. The extraction procedure 307 verifies if there were other wavelets produced before, generates and then stores the initial source wavelet. If other wavelets were created, the new wavelet is generated or parsed at 307, next to the previously generated wavelet from other traces of the same image gathers. The extraction procedure continues until all traces from the seismic reflection image gather data 304 have been analyzed. Once all wavelets have been statistically extracted by system computer 405, an extracted source wavelet is generated 307, and stored in memory resource 404 for later retrieval 308 by either the system computer 405 or the non-transitory program computer readable memory device, 406.

The system computer 405, then sends a message hook to the non-transitory program computer readable memory device, 406, to initiate sub-routine 310. Sub-routine 310, is then initiated by the non-transitory program computer readable memory device, 406 by retrieving from the memory resource 404, the final migration velocity model 309, the seismic reflection data 304, and the source wavelet 308. This sub-routine computes a reverse time migration (RTM) model 310 in depth-domain using system computer 405 and non-transitory program computer readable memory device, 406, hybrid GPU/CPU computer hardware, where both computational components take part in the computation of wave propagation and wave-field cross-correlation. This approach provides more efficient computational cost while reducing the artifacts produced by backscattering at sharp velocity contrasts. Once a final reverse time migration is generated, 626, and stored in the memory resource 404, it is then retrieved at 311, by system computer 405, and converted to time-domain 312. At 313, the final reverse time migration model in time-domain is then generated, and stored by the system computer 405, in memory resource 404. The system computer 405, then retrieves the final reverse time migration model in time-domain at 314, from the memory resource, 404, and initiates computing a root-mean-square (RMS) velocity model 315, assuming a sequence of parallel horizontal layers (like 102, 203, 204, 211, and 212) of interval velocity $V_{INT\ i}$ in the i-th layer for all the receiver traces, 214, at various travel time values of t. This is done in order to derive the interval velocity profiles of the seismic traces, 213 and 214. The root-mean-square velocity is then generated at 316, by system computer 405, and stored at memory resource, 404.

System computer then retrieves the root-mean-square (RMS) velocity model at 317, and sends a message hook to the non-transitory program computer readable memory device, 406, to initiate sub-routine 319. Sub-routine 319, computes a residual normal moveout (RNMO) corrected image gather from the corrected image gather, using the corrected image gather from the final reverse time migration image gather in time-domain, 319, to generate a residual normal moveout corrected image gather 710, and store it in the memory resource, 404. This sub-routine uses the amplitude versus offset (AVO) technique in order to automatically perform detailed residual moveout analysis. Automatic residual moveout operates as conventional normal moveout (2nd order) and as 4th order correction to correct gathers at large offsets which exhibit 4th order moveout. After the non-transitory program computer readable memory device, 406, generates and stores a residual normal moveout corrected image gather, 710; the system computer 405 retrieves the residual normal moveout image gather at 320, and processes another message hook to the non-transitory program computer readable memory device, 406, indicating the need to initiate sub-routine 321.

The non-transitory program computer readable memory device, 406, initiates sub-routine 321, using the retrieved residual normal moveout corrected image gather at 320, to compute a final flattened image gather. Computing a flattened image gather 321, from the corrected residual normal moveout image gather 320, generates an iso-proportional representation of the data based on specified horizons, times, and user-defined tolerance values. As such, sub-routine 321, applies an automatic and continuous velocity picking to the retrieved residual normal moveout corrected image gather 320, as well as corrects any residual moveouts from 320, that remain for final processing. A final flattened image gather is generated at 810, and stored in the memory resource, 404.

At 323, after receiving a message from the non-transitory program computer readable memory device, 406, the system computer 405, retrieves the final flattened image gather from the memory resource 404, and sends a message hook to the non-transitory program computer readable memory device, 406, to initiate sub-routine 323 of computing a final intercept volume and a final gradient volume from the retrieved final flattened image gather, 321.

Sub-routine 323 computes an intercept and gradient volumes using equation (15), to generate an initial intercept and gradient volume 905, that is then stored by the non-transitory program computer readable memory device, 406, to the memory resource 404, and the signals the system computer, 405, to retrieve the flattened image gather 324, and compute the multiplication 325 of the generated final intercept and gradient volumes 905. Said multiplication 325 applies the condition of $R_o*G<0$ for velocity and density changes in the opposite direction, to generate a small cave identification model, 326 (illustrated by FIG. 12). System computer 405, further evaluates if conditions like $R_o*G<0$ occurs when velocity and density change in the opposite direction, as well as $$\left|\frac{\Delta V_p}{V_p}\right| < \left|\frac{\Delta \rho}{\rho}\right|$$

on the mean time.

Figure 4:
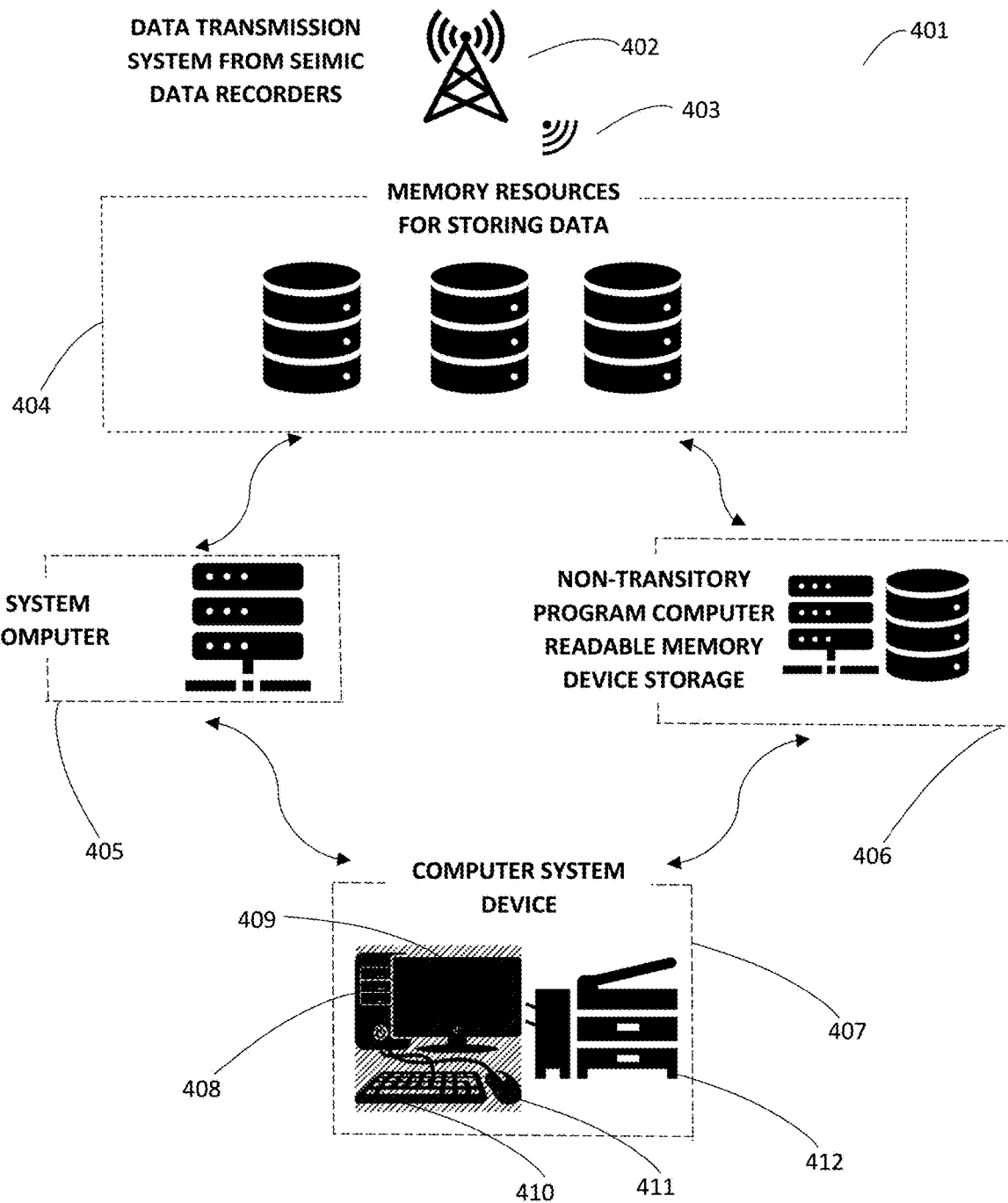
FIG. 4, is an electric diagram, in block form of the computing system apparatus programmed to perform the computer-implemented method, according to an embodiment of the present disclosure.

As it pertains to FIG. 4, it illustrates a functional block diagram of a computer system apparatus, 401, used to perform an array of operations of the computer-implemented method 301 used for subsurface cave recognition in a survey region. The computer system apparatus, 401, further incorporates (wired and/or wirelessly) memory resources, 404, for storing data transmitted from the receiving sensors 105, using wireless transmission systems, 402, and transmitted wireless, 403, a system computer, 405, a non-transitory program computer readable memory device storage, 406, and a computer system device, 407.

The computer system device, 407, acts as a user interface to system computer 405, and the non-transitory program computer readable memory storage device, 406; to input, set, select, and perform the operations of retrieving, computing, generating, invoking, determining, converting, and correcting functions (the message hook procedures). Said computer system device, 407, is connected to (wired and/or wirelessly) to the system computer 405, and non-transitory program computer readable memory storage device 406. The computer system device, 407, further includes other devices like a central processing unit (CPU), 408, a display or monitor, 409, a keyboard, 410, a mouse, 411, and a printer, 412.

The system computer device, 405, has firmware and software providing for the connection and interoperability of the multiple connected devices, like the memory resources for storing data, 404, the non-transitory program computer readable memory device storage, 406, and the computer system device, 407. The system computer, 405, includes an operating system, a set of message hook procedures, and a system application.

The operating system embedded within the system computer 405, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of system computer 405 may, for example, represent an operation or command of the memory resources, 404, the computer system device, 407, the non-transitory program computer readable memory storage device, 406, which may be currently executing a certain step process or subroutine from the computer-implemented method for small cave recognition using seismic reflection data.

The set of message hook procedures may be first initiated by an input from: the user, like the entering of user-defined values or parameters; the manipulation of the computer system device, 407; the processing of operations in the non-transitory program computer readable memory device storage, 406; or automatically once certain data has been stored or retrieved by either the memory resources, 404, or the non-transitory program computer readable memory device storage, 406. Based on any of these inputs, processes or manipulation events, the memory resources, 404, the non-transitory program computer readable memory storage device, 406, or the computer system device, 407; generate a data packet that is passed to the system computer, 405, which are indicative of the event that has occurred as well as the event that needs to occur. When system computer, 405, receives the data packet, it converts it into a message based on the event, and executes the required step of the computer-implement method. The computer-implement method includes a set of message hook lists that identifies the series of message hook procedures. When the operating system receives the message, it examines the message hook list to determine if any message hook procedures have registered themselves with the operating system. If at least one message hook procedure has registered itself with the operating system, the operating system passes the message to the registered message hook procedure that appears first on the list. The called message hook executes and returns a value to the system computer, 405, that instructs the system computer, 405, to pass the message to the next registered message hook, and either 404, 406 or 407. The system computer, 405, continues executing the operations until all registered message hooks have passed, which indicates the completion of the computer-implemented method by the generation of a small cave identification 326.

After the last message hook procedure has passed or been issued, the computer system device displays through a user-interface, on display 410, a message that indicates to the end user that the system computer, 405, has completed executing the computer-implemented method, and is ready to display on 410, and print on 412, a surface seismic reflection data represented in time-domain, a well log data represented in time-domain, an initial migration velocity model, a final migration velocity model, an image gather, a source wavelet, a final reverse time migration image gather in depth-domain, a final reverse time migration image gather in time-domain, a corrected image gather, a residual normal moveout corrected image gather, a final flattened image gather, a final amplitude versus angle volume, a set of initial moveout curves, a first, second, third and final Kirchhoff pre-stack depth migration gathers, an initial reflector dip-angle image, a final reflector dip-angle image, an updated initial migration velocity model, a user input flat value, a final intercept volume, a final gradient volume, and a small cave identification model.

Figure 5A:
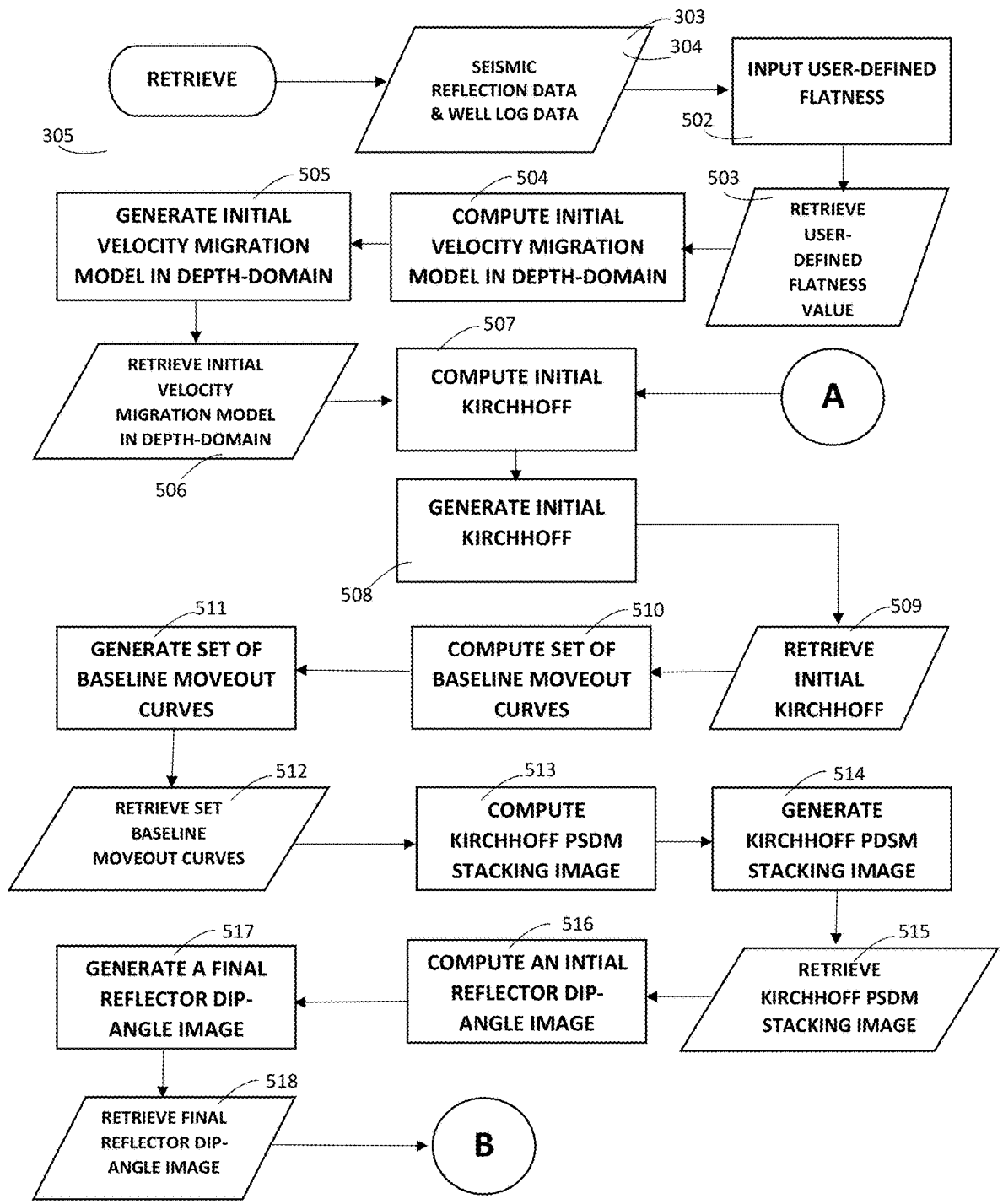
FIG. 5a, and FIG. 5b, are a flow chart showing the sub-routine of computing a final migration velocity model from the retrieved surface seismic reflection data and the retrieved well log data, as performed by the computing system apparatus, according to certain embodiments of the present disclosure.
Figure 5B:
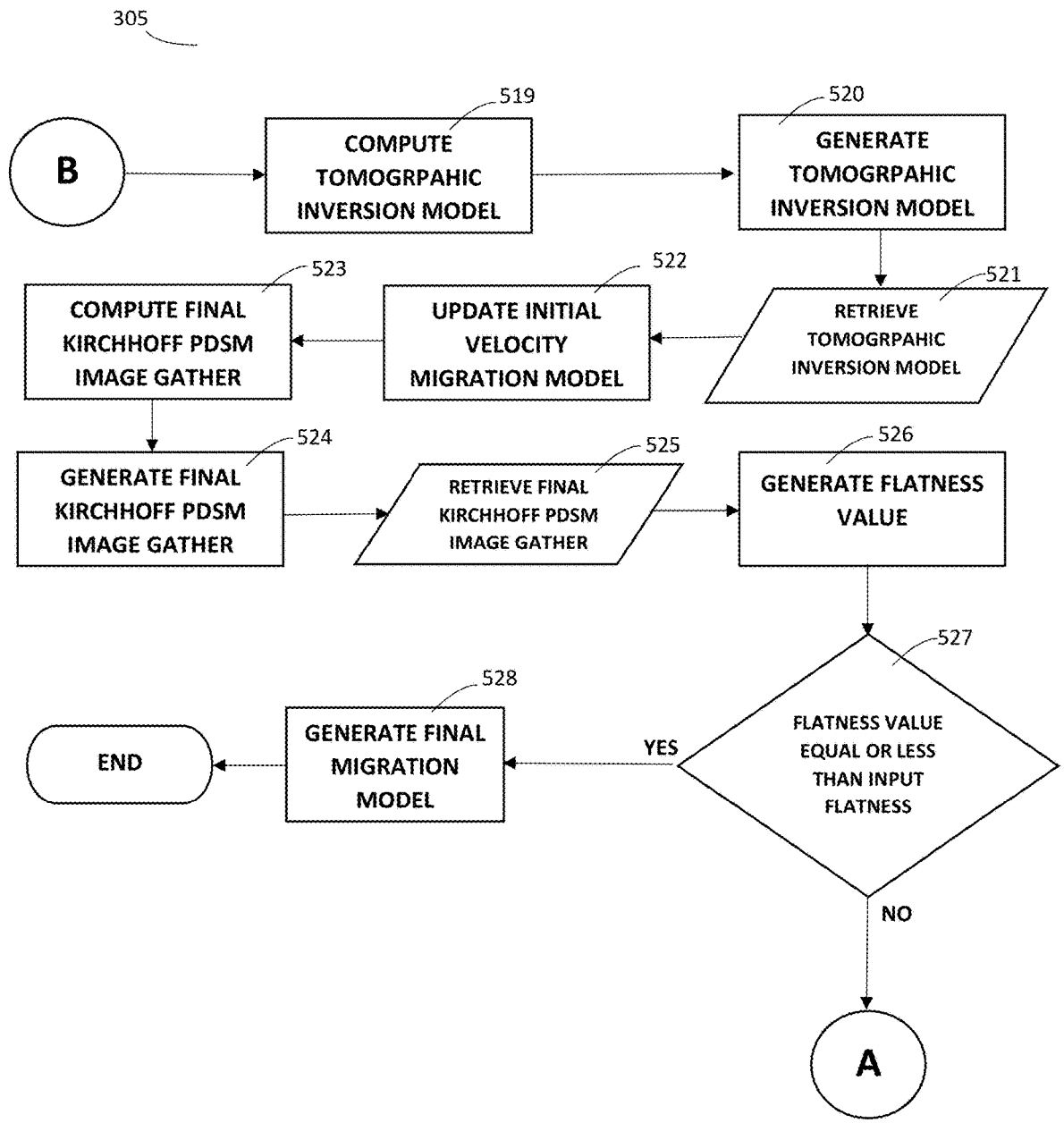

Sub-routine 305 of computing a final migration velocity model, as illustrated in FIG. 5a and FIG. 5b, is performed by a non-transitory computer readable memory device, 406, that is connected to a system computer 405, and a computer system device, 407. A message hook procedure initiated by the system computer 405 after retrieving the well log data, 303, and the seismic reflection data, 304, initializes the user-interface of the non-transitory computer readable memory device, 406, and displays on computer system 407 for the user to input a user-defined flatness value, 502, which is used control the degree of smoothness of cross-plots from actual and inverted elastic properties. In particular, the correct migration velocity will be the one that maximizes the flatness value of the slope decomposed diffraction events, as measured by coherence or another appropriate metric. Persons of ordinary skill in the art will realize that flatness values of diffraction events in gathers, provide a means for estimating migration velocity. Once the user inputs the user-defined flatness 502, the non-transitory computer readable memory device, 406, sends a message to the system computer 405 indicating that it has been stored in the memory resource, 404. The non-transitory computer readable memory device, 406, then retrieves the user defined flatness value at 503, and begins computing an initial migration velocity model in depth-domain, 504. The migration velocity model 504 optimizes the velocity of the seismic traces 213 and 214, by repositioning the reflected energy of seismic traces 214, to the correct point of incidence locations 104. The non-transitory computer readable memory device, 406, then stores the generated initial migration velocity model in depth domain 505, to the memory resource 404, and sends a message to the system computer 405 to initiate the retrieval of the initial migration velocity model in depth-domain at 506, so that the non-transitory computer readable memory device, 406, can continue processing well log data, 303, and seismic reflection data, 304, by computing the initial Kirchhoff pre-stack depth migration image gather algorithm, 507. The initial Kirchhoff pre-stack depth migration image gather algorithm, 507 is characterized by the summation of the reflection amplitudes along the diffraction travel time curves, in order to display the output images in display 409 of computer system 407. As such, it involves more Input/Output (I/O) from the memory resources, 404, the system computer 405, the non-transitory computer readable memory device, 406, and the computer system device, 407. This creates an efficient way of using memory resources, 406, as well as low computational costs for system computer 405. This is because, all the generated data are stored in the memory resource, 404, after the non-transitory computer readable memory device, 406, first performs certain computations on its co-located CPU clusters, and then transfer the computed data, either wired or wireless, to the hybrid CPU/GPU clusters co-located on the system computer, 405. Therefore, once the non-transitory computer readable memory device, 406, computes the initial Kirchhoff pre-stack depth migration image gather algorithm, 507, an initial Kirchhoff pre-stack depth migration image gather is generated at 508, and stored on the memory resource, 404. The system computer, 405, then retrieves the initial Kirchhoff pre-stack depth migration image gather at 509 from the memory resource, 404, and signals the non-transitory computer readable memory device, 406, to start computing a set of baseline moveout curves at 510, which correspond to the difference in the arrival times or travel times of the reflected trace, 214, measured by receivers 105, at two different offset locations, 210. A set of initial moveout curves are generated at 511, stored on memory resource 404, and retrieved by system computer, 405, which then signals the non-transitory computer readable memory device, 406, to start computing a Kirchhoff pre-stack depth migration (PSDM) stacking image 513. PDSM stacking images from multichannel seismic reflection data (meaning multiple shots 104, captured by multiple receivers 105), is a crucial step in seismic data processing, as it leads to the first interpretable seismic image. Here, the processed seismic record containing traces 213 and 214 are added together from different records to reduce noise, improve overall data quality and enhanced the reflection of the source point 211 or 212. Once the non-transitory computer readable memory device, 406, computes the Kirchhoff pre-stack depth migration stacking image gather algorithm, 513, a Kirchhoff pre-stack depth migration stacking image gather is generated at 514, and stored on the memory resource, 404. The system computer, 405, then retrieves the Kirchhoff pre-stack depth migration stacking image gather at 515 from the memory resource, 404, and signals the non-transitory computer readable memory device, 406, to start computing an initial reflector dip-angle image at 516. The initial reflector dip-angle is the measure between a surface layer, 102, of the survey region 101, and the subsurface fault, 211, and/or cave, cavern, 212, which is computed in by using a combination of apparent dip-angles, which are measured in any direction other than perpendicular to the strike of the plane. Once computed at 516, a final reflector dip-angle is generated at 517 by the non-transitory computer readable memory device, 406, and stored on memory resource 404. The system computer, 405, receives the signal to retrieve the generated final reflector dip-angle image at 518. Once 518 is retrieved, the non-transitory computer readable memory device, 406, begins computing at 519, a tomographic inversion model using the retrieved set of initial moveout curves, 512, and the retrieved final reflector dip-angle, 518.

The tomography inversion used by the present invention involves computing statics corrections in the seismic reflection survey region making use of refraction tomography, and transmission tomography. The computed tomography uses equation (3) but with multiple iterations, in order to converge on the best estimate of the true model, thereby minimizing the differences between the observed travel times and those computed by ray tracing for the current guess of the model. Once computing the tomographic inversion model, 519 is complete, the non-transitory computer readable memory device, 406, generated a tomographic inversion model, at 520, and stores on memory resource 404. The system computer, 405, receives the signal to retrieve the generated tomographic inversion model at 521, and signals, the non-transitory computer readable memory device, 406, to begin 522 by updating the generated initial migration velocity model 506. Once updated, the non-transitory computer readable memory device, 406, starts computing, at 523 the final Kirchhoff pre-stack depth migration image gather from the updated initial migration velocity model 506. The non-transitory computer readable memory device, 406, generates, then stores on memory resource 404, a final pre-stack depth migration image gather, 524. The system computer, 405, then receives the signal to retrieve the generated final pre-stack depth migration image gather, at 525, and provides it to the non-transitory computer readable memory device, 406, to generate, at 526, a flatness value of the retrieved final Kirchhoff pre-stack depth migration image gather. The system computer, 405, then sends the inputted user-defined flatness value 502, to the non-transitory computer readable memory device, 406, to begin computing, at 527, the inequality between the generated flatness value 526 against the inputted user-defined flatness value 502. If the non-transitory computer readable memory device, 406, determines that the generated flatness value 526 is equal to, or less than, the inputted user-defined flatness value 502, then it generates the final migration velocity model of 528. If the generated flatness value 526 is greater than, the inputted user-defined flatness value 502, the non-transitory computer readable memory device, 406, sends a message to system computer, 405, that it will re-initiate from step 507 of computing an initial Kirchhoff pre-stack depth migration image gather, until it determines that the generated flatness value 526 is equal to, or less than, the inputted user-defined flatness value 502. Nevertheless, a person having ordinary skills in the art would soon realize that, to save on computational cost the user of computer system, 407, may at any time stop iteration 527, determining through the use of the display 409, that the stored data, and the inequality are complete, thereby indicating through the use of keyboard 410, and mouse 411 to the CPU 408, that the non-transitory computer readable memory device, 406 should stop computing iteration 527.

Figure 6A:
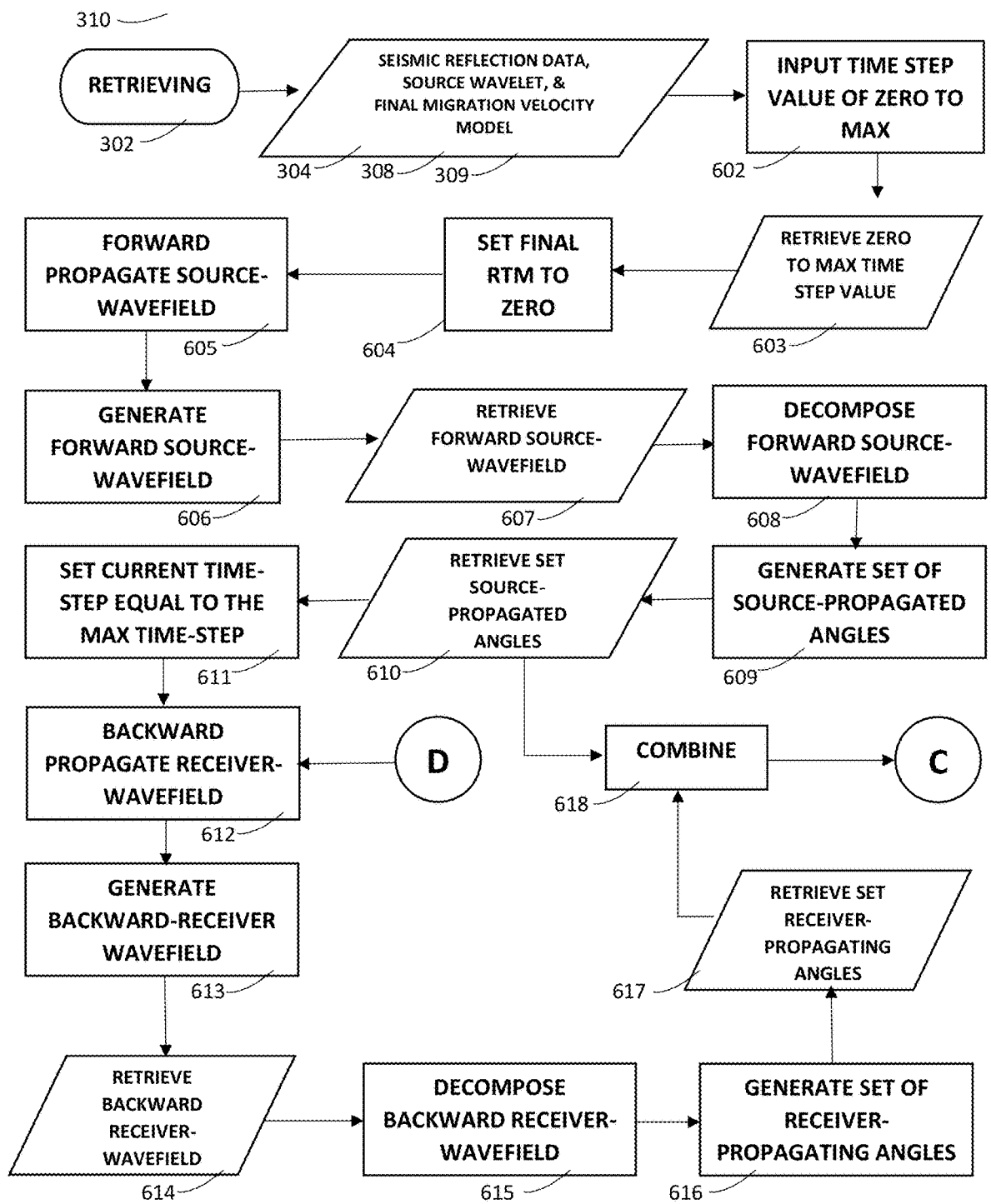
FIG. 6a, and FIG. 6b, are a flow chart showing the sub-routine of computing a final reverse time migration image gather, using the retrieved surface seismic reflection data, the retrieved final migration velocity model, and the generated source wavelet, employing a finite difference method, according to certain embodiments of the present disclosure.
Figure 6B:
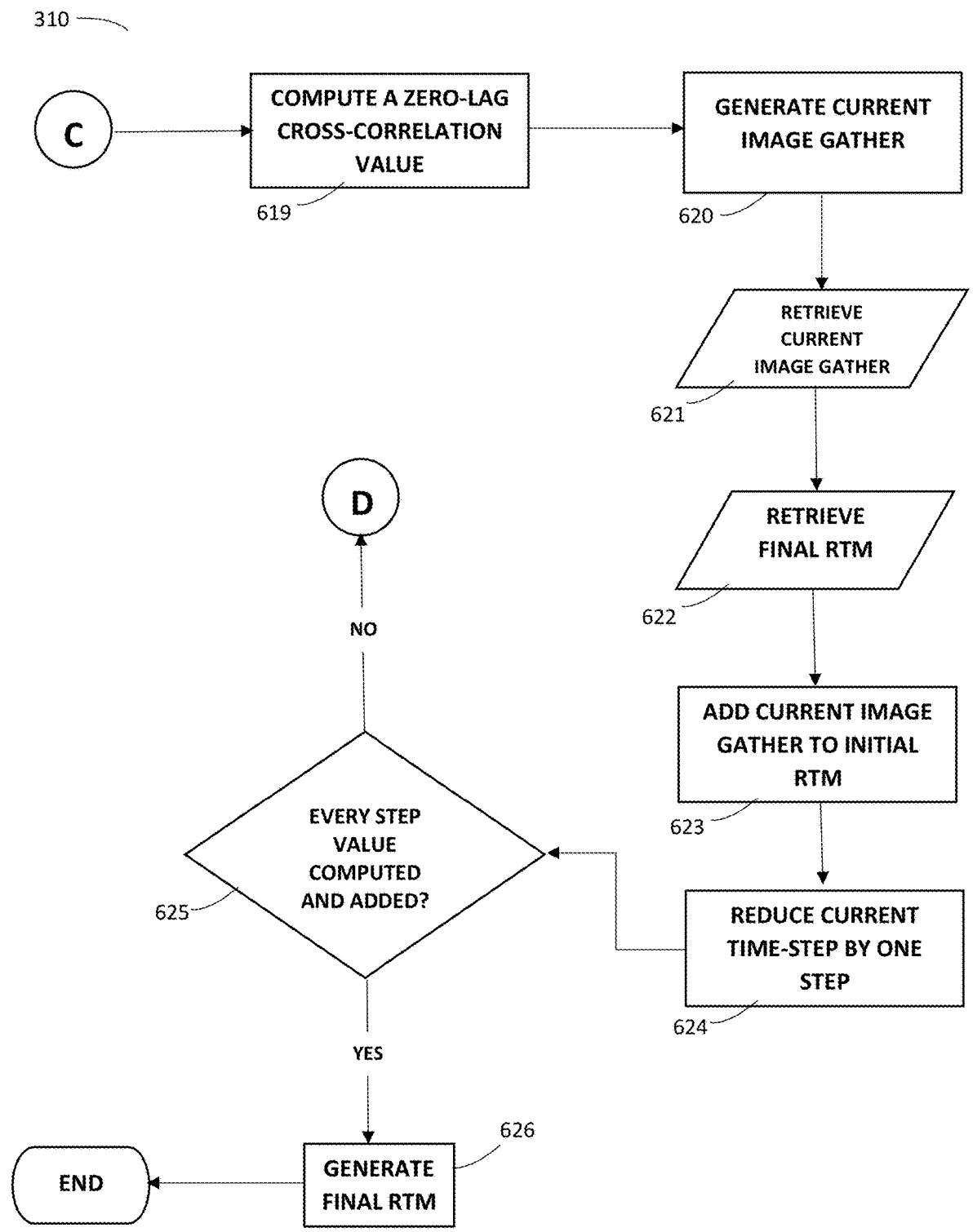

Sub-routine 310 of computing a final reverse time migration image gather, using the retrieved surface seismic reflection data, the retrieved final migration velocity model, and the retrieved source wavelet, employing a finite different method is illustrated by FIG. 6a, and FIG. 6b. Sub-routine 310 is performed by a non-transitory computer readable memory device, 406, that is connected to a system computer 405, and a computer system device, 407. A message hook procedure initiated by the system computer 405 after retrieving the seismic reflection data, 304, the source wavelet 308, and the final migration velocity model 309; engages the non-transitory computer readable memory device, 406, to display on 409, a user interface indicating to a person having ordinary skills in the art, to input at 602, a time-step value of zero, and a maximum time-step value. The user-defined maximum time-step value is the maximum trace time divide the finite different (FD) time interval. A person having ordinary skills in the art, will realize that the FD time interval is determined by model grid size, data frequency, velocity value, as well as how deep the image will go. As such, the maximum time-step value will normally range from one thousand, to twenty thousand steps. The non-transitory computer readable memory device, 406, then stores the inputted zero to maximum time-step values in the memory resource 404, and messages the system computer 405, to retrieve at 603, the zero to maximum time-step values so that the non-transitory computer readable memory device, 406 can set the initial reverse time migration to zero at step 604, and store it in the memory resource, 404. The system computer 405 initiates a retrieval process from the memory resource 404 of the source wavelet 308, and messages the non-transitory computer readable memory device 406, to initiate the forward propagation algorithm of the source-wavefield, at step 605, from the retrieved seismic reflection data 304, with the retrieved source wavelet 308, using a finite difference method, from the retrieved time-step value of zero, to the retrieved maximum time-step values, 603.

Step 605 computes a forward wave propagation in the subsurface by inputting the wavefield recorded at the surface, 102, and by stepping backwards in time, thereby propagating the seismic events to the subsurface location where they were generated, 211 and 212. The non-transitory computer readable memory device 406, does so by reversing the forward modeling operation, inputting the retrieve final migration velocity model 309, selecting the source location, and computing the wave equation $f(x \pm vt)$ (where x is the source-wavefield, v the velocity of the wave, and t is time); in incremental time steps from the time-step value of zero to the time-step maximum value, 603. Nevertheless, the computational method used by the non-transitory computer readable memory device 406, to solve the multiple differential equations, uses the finite difference method by approximating the differential equations with difference equations, in which finite differences, approximate the derivatives. Thereafter, the non-transitory computer readable memory device 406, generates, then stores in memory resource 404, the forward source-wavefield 606 for the system computer 405, to retrieve at 609 and message back to the non-transitory computer readable memory device 406, that the forward-source wavefields should be decomposed at 608, into a set of source propagated angles, using optic flow method. Then, the set of source-propagated angles 609 are generated, then stored in memory resource, 404. At such point, the non-transitory computer readable memory device 406, messages the system computer 405 to retrieve, at step 610, the generated set of source propagated-angles from the memory resource 404.

Thereafter, at 611, the non-transitory computer readable memory device 406, messages the computer system device 407 to display on 409, a user interface showing that a new time-step value has been set by the non-transitory computer readable memory device 406, which equals the inputted user-defined maximum time-step value 602. Upon confirmation of said setting 611 by the user through the use of keyboard 410, and mouse 411 the non-transitory computer readable memory device 406, stores the recently set current time-step value in memory resource 404. The non-transitory computer readable memory device 406, messages the system computer 405 to retrieve from the memory resource, 404, the seismic reflection data containing the receiver-wavefields. Once retrieved, the system computer messages the non-transitory computer readable memory device 406, who instead begins, at 612, backward propagating employing the finite difference method, the retrieved receiver-wavefield at the set current time-step value 611 plus one incremental time-step value. Upon completion of the computing step 612, the non-transitory computer readable memory device 406, generates and stores in memory resource 404, the backward propagated receiver-wavefield 613 for the system computer 405, to retrieve at 609 and message back to the non-transitory computer readable memory device 406, that the backward propagated receiver-wavefields should be decomposed at 615, into a set of receiver-propagated angles, using optic flow method at the current time-step value. Then, the set of receiver-propagated angles 616 are generated, then stored in memory resource, 404. The non-transitory computer readable memory device 406, messages the system computer, 405, to retrieve 617 the generated set of receiver propagated-angles at current time step value from the memory resource. At which point, the non-transitory computer readable memory device 406, combines at 618 the retrieved set of source propagated-angle, with the retrieved set of receiver propagated-angles at current time-step value. Thereafter, the non-transitory computer readable memory device 406, begins computing at 619, a zero-lag cross-correlation value image condition for every retrieved source-wavefield 607, and receiver-wavefield 614, as well as for every combined source 610 and receiver 617 propagated-angles, at current time-step value. During step 619, the non-transitory computer readable memory device 406, is searching for similarities between the different set of signals (607, 614, 610, 617) being computed. The zero-lag used by the non-transitory computer readable memory device 406, refers to the offset of the aforementioned signals, which a person of ordinary skill in the art will realize it provides the dot product for the retrieved signals.

Then, non-transitory computer readable memory device 406, generates, then stores at 620, a current image gather from the computed zero-lag cross-correlation value. The non-transitory computer readable memory device 406, messages the system computer, 405, to retrieve the generated current image gather 621, as well as the initial reverse time migration image gather 622. At which point, 623, the non-transitory computer readable memory device 406, computes the summation of the retrieved current image gather 621 to the retrieved initial reverse time migration image gather 622, and then reduces at 624, the current time-step value by the one incremental 611; and verifies at 625, whether the current image gather 620 for every time step value from the input maximum time-step value, to the time-step zero value, 603, was computed and added at 623 to the initial reverse time migration image gather, 622. The non-transitory computer readable memory device 406, messages the system computer 405, the successful execution of the verification process 625, and generates and store a final reverse time migration image gather at 626.

If the non-transitory computer readable memory device 406, messages the system computer, 405, indicating that step 625 was not successfully executed, the system computer, 405, messages the non-transitory computer readable memory device 406, to repeat sub-routine 310 but starting from the step of backward propagating receiver-wavefield from the retrieved seismic reflection data at the current time-step value, 612 instead. Nevertheless, a person having ordinary skills in the art would soon realize that, to save on computational cost, the user of computer system 407, may at any time stop verification 625.

Figure 7:
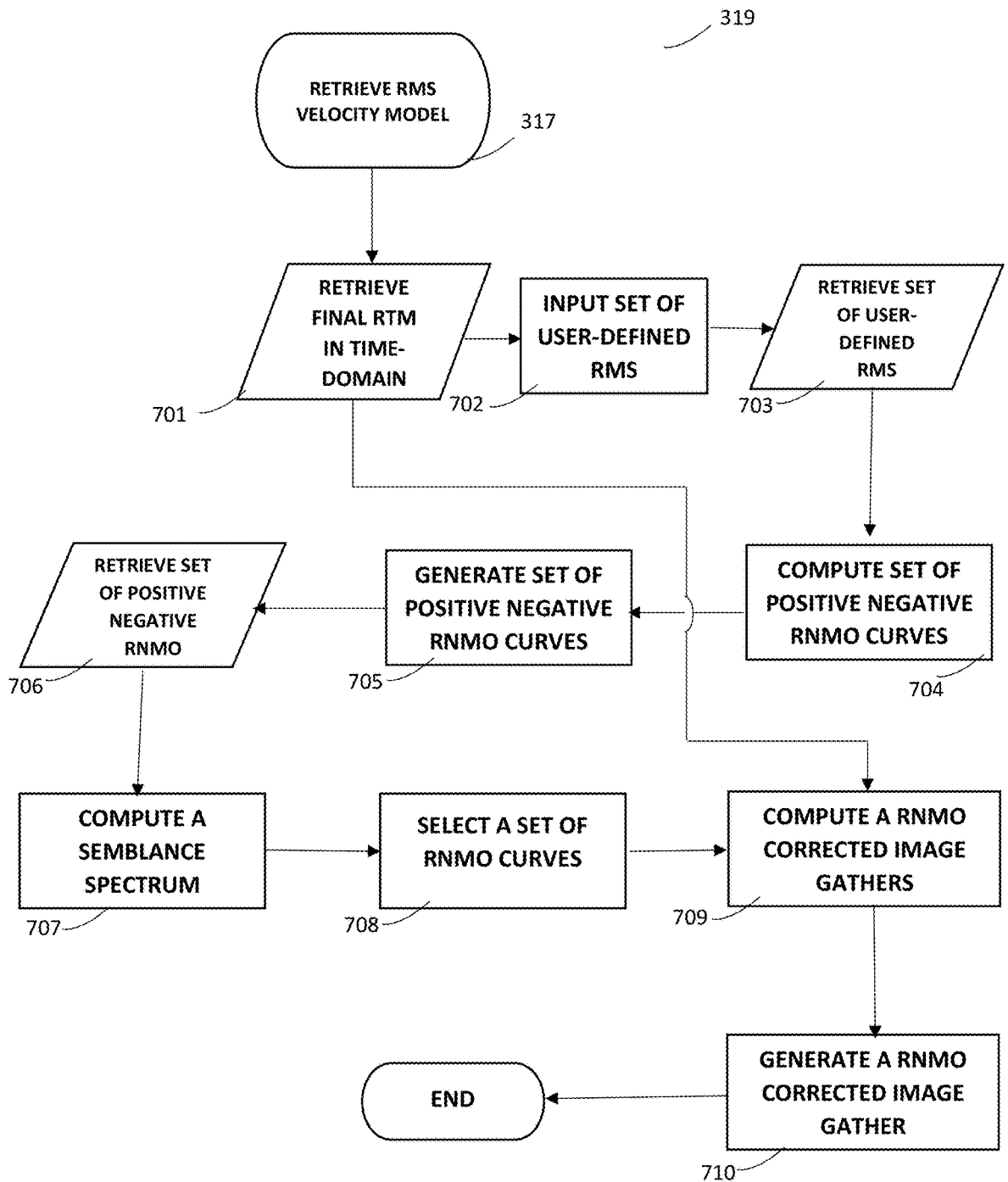
FIG. 7, is a flow chart showing the sub-routine of computing a residual normal moveout corrected image gather from the corrected image gather, according to certain embodiments of the present disclosure.

According to the preferred embodiment of the invention, the sub-routine in the computer-implemented method 301, that computes a residual normal moveout corrected image gather 319, is illustrated in FIG. 7. Sub-routine 319 is initiated after the system computer 405, corrects an image gather from the retrieved final reverse time migration image gather in time-domain and the retrieved final root-mean-square velocity, employing the residual normal moveout correction to the retrieved final reverse time migration image gather 320. The system computer 405, messages the non-transitory computer readable memory device 406, that the final reverse time migration image gather in time-domain has been retrieved at 701, from the memory resource 404 and that the user of computer system 407, can begin inputting at 702, a set of user-defined root-mean square velocities. The user inputs velocities 702, from a set of pre-determined model parameters for caves and overburden layers, using synthetic acoustic data from the studied area like that illustrated by FIG. 10. Once the velocities 702 have been inputted through the computer system 407 using a combination of keyboard 410 and mouse 411 actions, the non-transitory computer readable memory device 406, stores the inputted set of user-defined root-mean-square (RMS) velocities and messages the system computer 405, to retrieve the set of user-defined root-mean-square velocities at 703, from the memory resources, 404. Upon completing the retrieval process 703, the system computer messages the non-transitory computer readable memory device 406, to begin 704 computing a set of positive and negative residual normal moveout curves using the retrieved final reverse time migration image gather in time-domain 701, with the retrieved set of user-defined root-mean-square velocities, 703. The non-transitory computer readable memory device 406, generates, at 705, the set of positive and negative residual normal moveout curves from the computed set of positive and negative residual normal moveout curves, 704, then stores them in the memory resource, 404. The non-transitory computer readable memory device 406, messages system computer 405, to retrieve at 706 the set of positive and negative residual normal moveout curves, and begin computing a semblance spectrum for the retrieved set of positive and negative residual normal curves, at 707. To avoid what a person having ordinary skill in the art realizes when computing semblance spectrum, the non-transitory computer readable memory device 406, will execute 707 utilizing algorithm from equation (13) thereby avoiding all limitations of semblance spectrum analysis, like low resolution that causes erroneous picking, expensive computation cost for the semblance in anisotropic media, and poor adaptability to the seismic data with AVO. As a result, this improved method of computing semblance spectrum 707 produces a set of residual normal moveout curves corresponding to the computed semblance spectrum with peak values, that allows a user, through a user interface displayed on computer system 407, to select at 708 set of residual normal moveout curves corresponding to the computed semblance spectrum with peak values. Upon confirmation through the actioning of keyboard 410, and mouse 411, the non-transitory computer readable memory device 406, will compute a residual normal moveout corrected image gather at 709, from final reverse time migration image gather in time-domain 701, using the user selected set of residual normal moveout curves 708. The non-transitory computer readable memory device 406, will then generate a residual normal moveout corrected image gather at 710, and stored it in the memory resource, 404.

Figure 8:
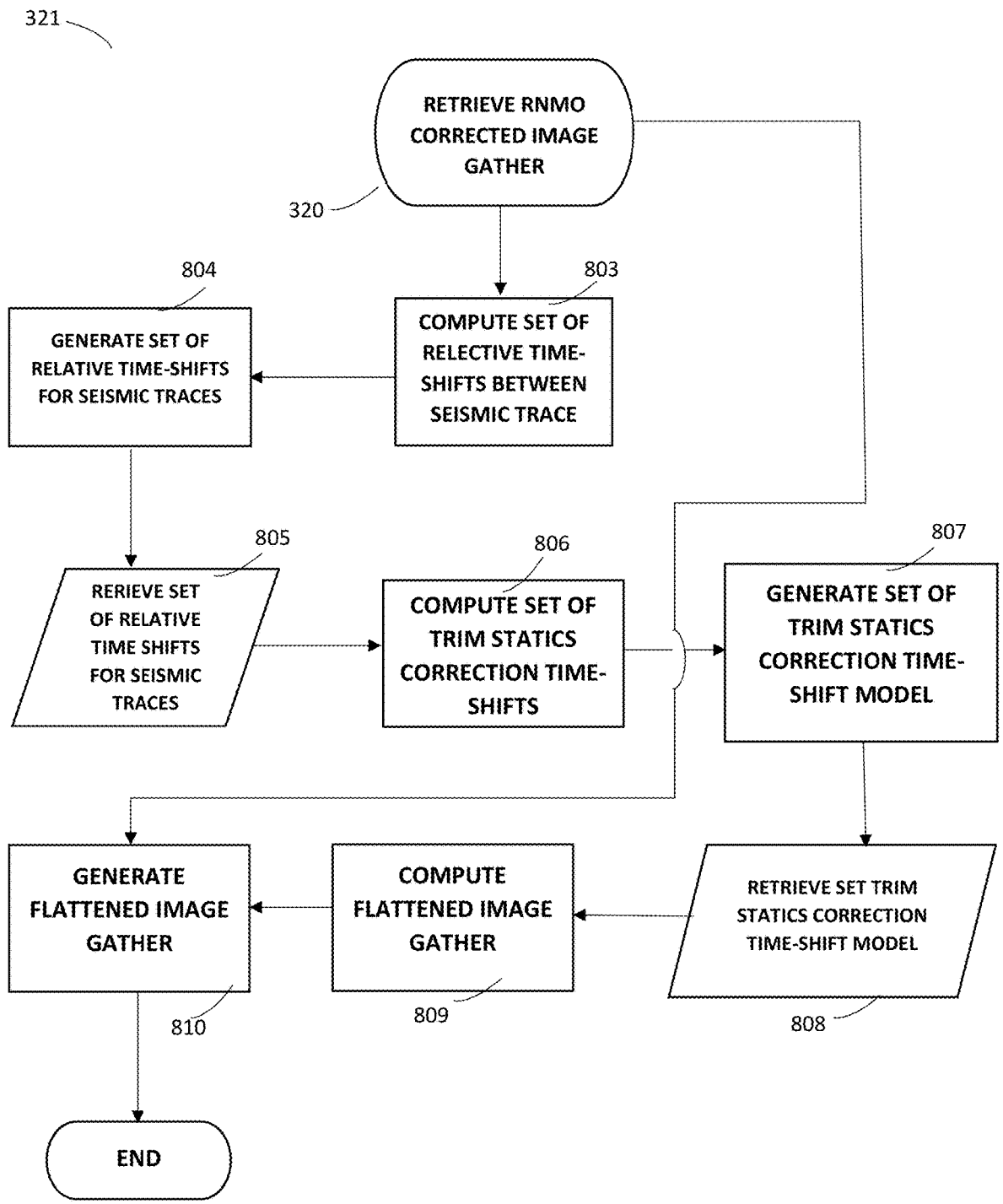
FIG. 8, is a flow chart showing the sub-routine of computing a final flattened image gather from the retrieved residual normal moveout corrected image gather, according to certain embodiments of the present disclosure.

With sub-routine 319 concluded, the system computer 405 messages the non-transitory computer readable memory device 406, to retrieve the residual normal moveout corrected image gather 320 and begin sub-routine 321. This sub-routine computes a final flattened image gather from the retrieved residual normal moveout corrected image gather, employing trim statics correction method; and is illustrated by FIG. 8. In particular, sub-routine 321 seeks the automatic flatness picking of an event, on a residual normal-moveout-corrected image gather, or as it is commonly understood in the art to mean, that the residual normal moveout velocity associated with that event is optimum thereby improving the quality of the final stacked image. This automated method of computing a final flattened image gather can be achieved by the pre-processing done by the computer-implemented method up to the point of sub-routine 321, in combination retrieved residual normal moveout corrected image gather 320. System computer 405, sends a message to the non-transitory computer readable memory device 406, indicating the retrieval 320 from memory resource 404 was completed, so that the non-transitory computer readable memory device 406, can compute at 803, a set of relative time shifts (or depth shifts) between the seismic traces from the retrieved residual normal moveout corrected image gather, employing a cross-correlation method. The non-transitory computer readable memory device 406, generates at 804 the computed set of relative time shift for all seismic traces, and messages the system computer 405 to begin the retrieval process 805 of the set of relative time shifts. The non-transitory computer readable memory device 406, computes a set of trim statics correction time-shifts for all seismic traces at 806. It then generates a trim statics correction time-shifts model for each seismic trace at 807, and stores it in the memory resource, 404. Once stored, the system computer 405 retrieves the generated trim statics correction time shift model from the memory resource 404, and messages the non-transitory computer readable memory device 406, to start computing algorithm for equation (14) for a flattened seismic image gather 809, applying the retrieved trim statics correction time shift model 808 to each seismic trace. Thereafter the non-transitory computer readable memory device 406, generates at 810 a final flattened image gather, using the retrieved residual normal moveout corrected image gather 320, and stores the generated final flattened corrected image gather 810, into the memory resource, 404.

Figure 9:
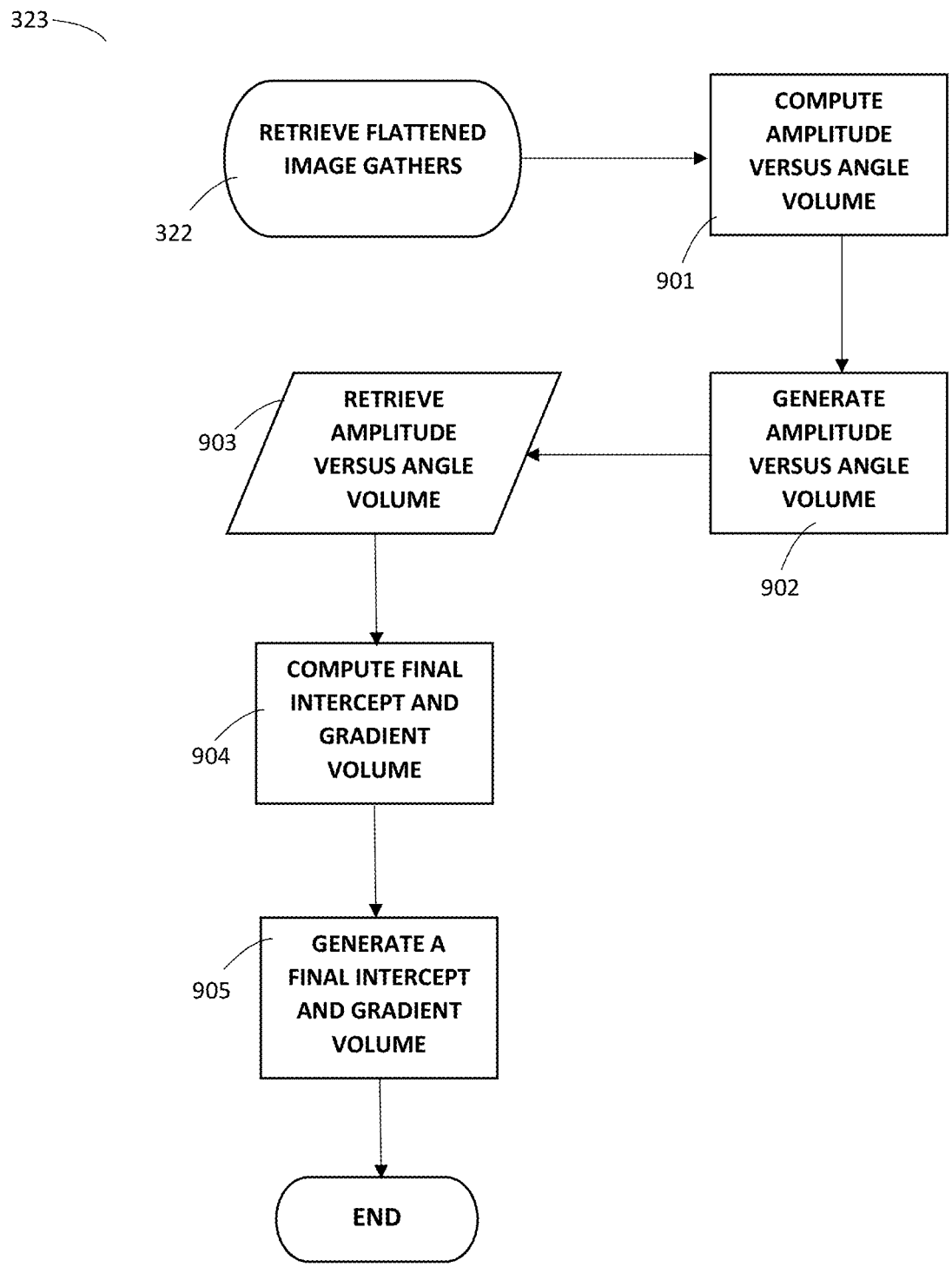
FIG. 9. Is a flow chart showing the sub-routine of computing a final intercept volume and a final gradient volume using the retrieved final flattened image gather, according to certain embodiments of the present disclosure.

FIG. 9 illustrates sub-routine 323 of computing a final intercept volume and a final gradient volume using the retrieved final flattened image gather. According to the preferred embodiment of the invention, sub-routine 323 initiates after system computer 405 has the generated final flattened image gather from the computed final flattened image gather 323 from memory resource 404, and messages the non-transitory computer readable memory device 406, to begin computing at 901, a set of amplitude versus angle (AVA) volumes from the retrieved final flattened image gather. Said computation is performed on the reflectivity of boundaries between isotropic homogeneous half-spaces and used for interpreting the physical properties of cave 212. It is based on real boundaries of cave 212 and expresses the variation of reflectivity using actual angles of incidence like 208, and offsets like 210. The non-transitory computer readable memory device 406 then generates at 902, a final amplitude versus angle volume, and stores it in memory resource 404. System computer 405 will receive the message from the non-transitory computer readable memory device 406 that the final amplitude versus angle volume has been stored in memory resource 404, and begins process 903 of retrieving the generated final amplitude versus angle volume. The retrieved final amplitude versus angle volume is then used by the non-transitory computer readable memory device 406 to compute at 904 a final intercept volume and a final gradient volume, using least squares regression analysis. The final intercept volume and final gradient volume are then generated at 905 by the non-transitory computer readable memory device 406 for storage on memory resource 404.

Figure 10:
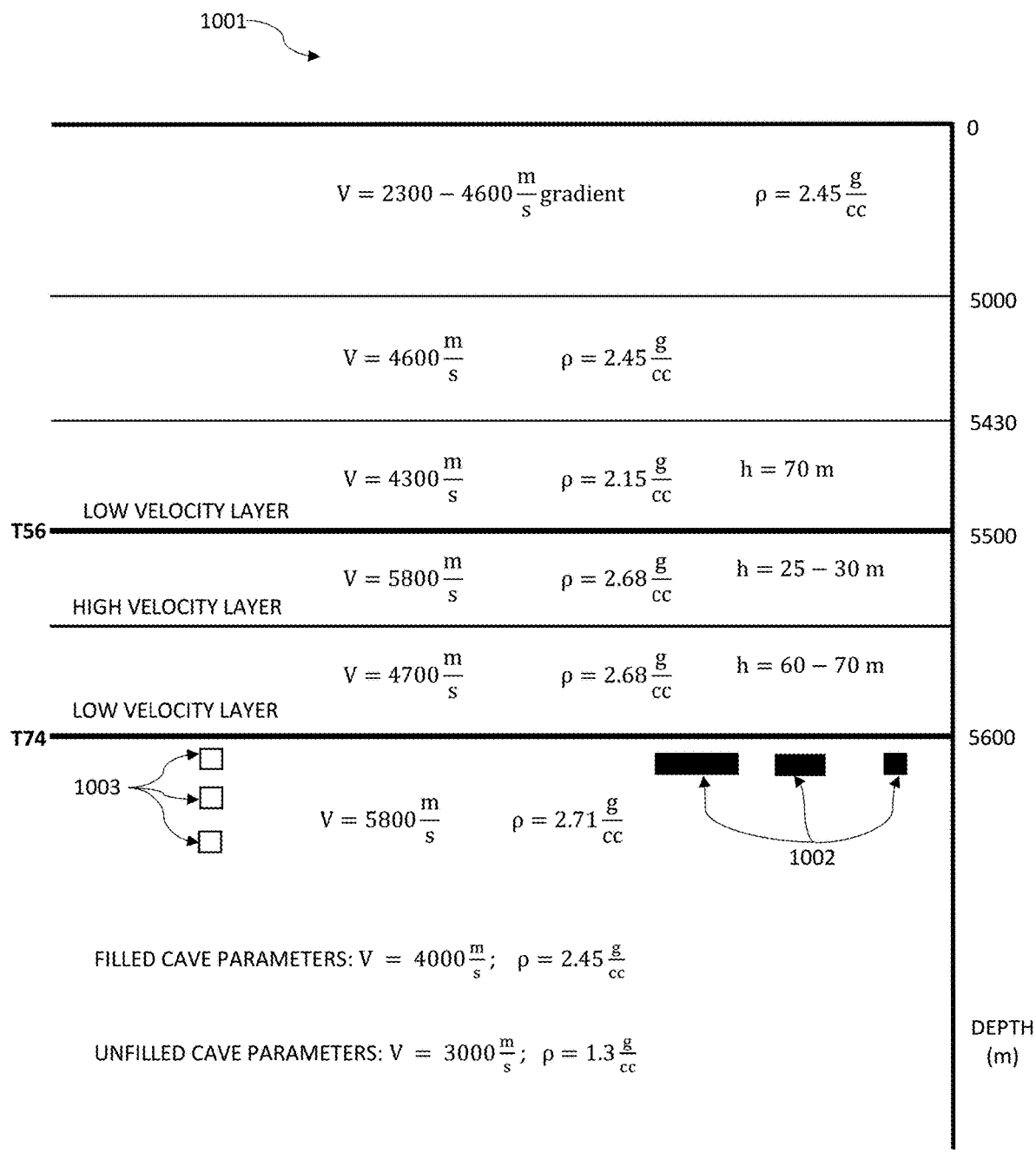
FIG. 10. Illustrates in graphic representation, a set of cave recognition model parameters for caves and overburden layers, as generated by the computing system apparatus, employing the computer-implemented method for synthetic data to be used as user-defined parameters, according to an embodiment of the present disclosure.

In FIG. 10, the graphical representation 1001 shows a set of cave recognition user-defined synthetic parameters (or values), for caves and overburden layers, as needed to be inputted by the user of computing system apparatus, employing the computer-implemented method for obtaining a cave recognition model. 1002 represents filled caves, while 1003 represents unfilled caved, both with their respective parameters as used in the present invention show in said graphical representation 1001.

Figure 11:
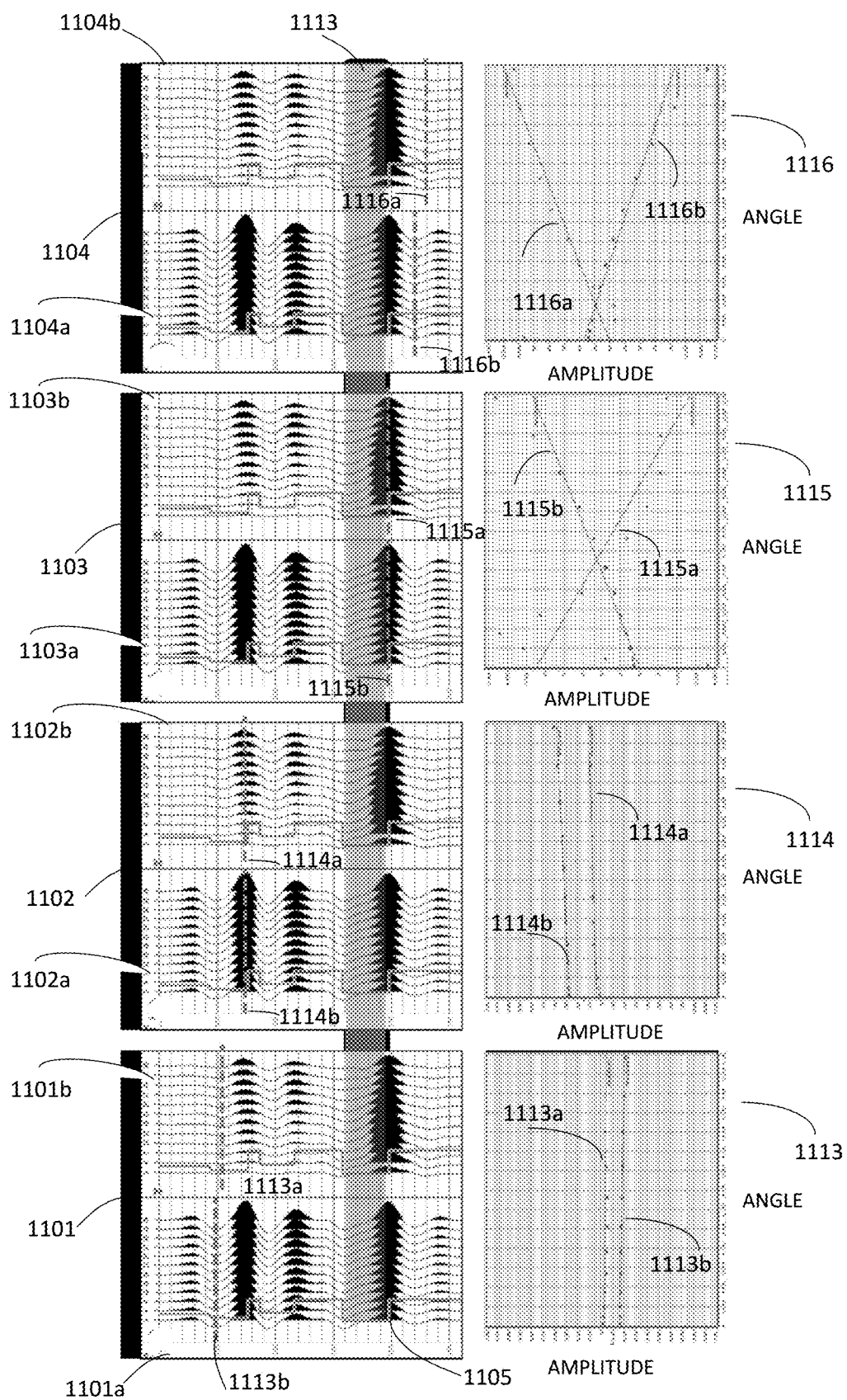
FIG. 11. Illustrates in graphic representation, four different sets of positive and negative residual normal moveout curves after post reverse time migration gather processing and image correction using the synthetically enter data, as compared to four different sets of positive and negative residual normal moveout curves after post reverse time migration gather processing and image correction; as generated by the computing system apparatus, one using user-defined synthetically generated parameters and non-synthetic parameters; according to an embodiment of the present disclosure.

In FIG. 11, the graphical representation shows a comparison of four different sets of common image gather traces in one dimension, using synthetically entered data (1101a, 1102a, 1103a, 1104a); against four different sets of reverse time migration (RTM) common image gather traces (1101b, 1102b, 1103b, 1104b) using the computer-implemented method of the present invention. 1101 and 1102 show the trough and peak features of an over-burden reflector, while 1103 and 1104 show the trough and peak from the bottom of the cave. A velocity profile is illustrated by lines 1105, 1106, 1107, 1108, 1109, 1110, 1111, and 1112, while a cave model is shown as an over-imposed translucent shadow 1113. According to an embodiment of the present disclosure, illustrations 1113, 1114, 1115, and 1116 show an amplitude versus angle chart corresponding to the above illustrated reverse time migration gathers as generated employing the computer-implemented method, as well as their synthetic comparisons. Lines 1113a, 1114a, 1115a, and 1116a correspond to the reverse time migration image gather as generated by the computer system apparatus 401 employing the computer-implement method 301, while lines 1113b, 1114b, 1115b, and 1116b are synthetically generated by user-defined parameters.

Figure 12:
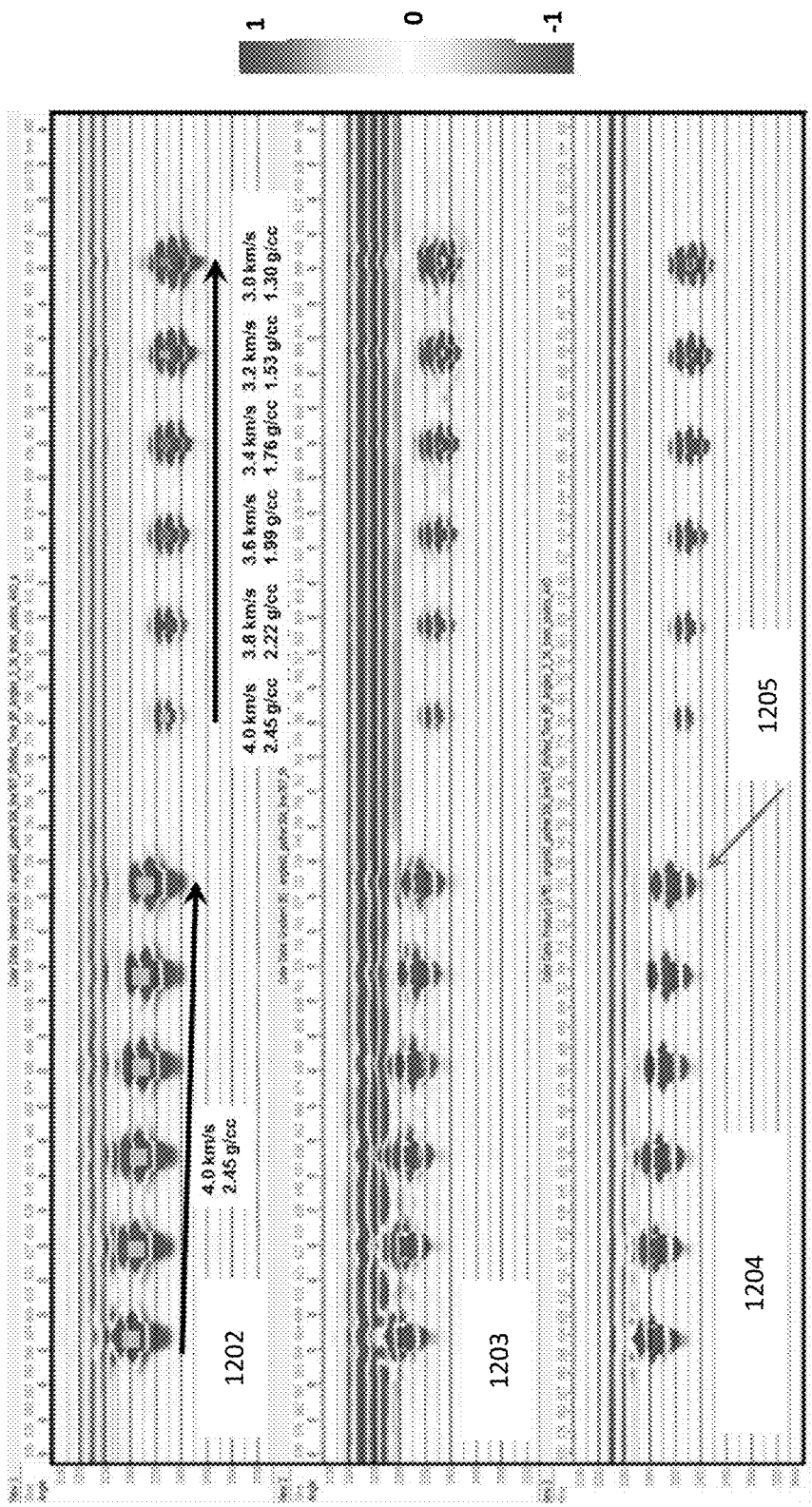
FIG. 12. Illustrates in graphic representation, a small cave identification model from the multiplied intercept and gradient volumes as generated by the computing system apparatus.

In FIG. 12 the graphical representation of the small cave identification model 326, is shown. When dividing up the parameters according to their individual representations, chart 1202 shows the intercept, chart 1203 the gradient, and chart 1204 shows the computed intercept and gradient multiplication 325. According to an embodiment of the present disclosure, illustration 1204 shows an intercept to gradient multiplication 325 with overburden reflectors, while negative abnormalities when small caves are still recognized at 1205 by the computer-implement method and system of the present disclosure.

Unless specifically stated otherwise, terms such as "defining", "creating", "including", "representing", "pre-analyzing", "pre-defining", "choosing", "building", "assigning", "creating", "introducing", "eliminating", "re-meshing", "integrating", "discovering", "performing", "predicting", "determining", "inputting", "outputting", "identifying", "analyzing", "using", "assigning", "disturbing", "increasing", "adjusting", "incorporating", "simulating", "decreasing", "distributing", "specifying", "extracting", "displaying", "executing", "implementing", and "managing", or the like, may refer to the action and processes of a computer system, or other electronic device, that transforms data represented as physical (electronic, magnetic, or optical) quantities within some electrical device's storage, like memory resources, or non-transitory computer readable memory, into other data similarly represented as physical quantities within the storage, or in transmission or display devices.

According the preferred embodiment of the present invention, certain hardware, and software descriptions were detailed, merely as example embodiments and are not to limit the structure of implementation of the disclosed embodiments. For example, although many internal, and external components of the computer system apparatus of FIG. 4 have been described, those with ordinary skills in the art will appreciate that such components and their interconnection are well known. Additionally, certain aspects of the disclosed invention may be embodied in software that is executed using one or more system computers as 405. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

As used herein, the term "computing" encompasses a wide variety of actions, including calculating, determining, processing, deriving, investigation, look ups (e.g. looking up in a table, a database or another data structure), ascertaining and the like. It may also include receiving (e.g. receiving information), accessing (e.g. accessing data in a memory) and the like. Also, "computing" may include resolving, selecting, choosing, establishing, and the like.

As used herein, the term "trim static", "static trimming" is used to refer to any time shift that is estimated from the cross-correlation process and applied directly to the input trace.

As used herein, "subsurface", and "subterranean" means beneath the top surface of any mass of land at any elevation or over a range of elevations, whether above, below or at sea level, and/or beneath the floor surface of any mass of water, whether above, below or at sea level.

Embodiments disclosed herein also relate to computer-implemented system, and computer system for performing the operations herein. This system may be specially constructed for the required purposes, or it may comprise a general-purpose computer selectively activated or reconfigured by a computer program or code stored in the memory resources, or non-transitory computer readable memory. As such, the computer program or code may be stored or encoded in a computer readable medium or implemented over some type of transmission medium. A computer-readable medium includes any medium or mechanism for storing or transmitting information in a form readable by a machine, such as a computer ('machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical or other form of propagated signals (e.g., carrier waves, infrared signals, digital signals, etc.)).

A computer system as used herein, typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices and networks.

An "output device" includes the direct act that causes generating, as well as any indirect act that facilitates generation. Indirect acts include providing software to an user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, a LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the a local network, a wireless network of the Internet.

Furthermore, modules, features, attributes, methodologies, and other aspects can be implemented as software, hardware, firmware or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

Symbols Table

| Symbol | Brief Definition | Symbol | Brief Definition |
|---|---|---|---|
| $R_O$ | Intercept value | d | Distance |
| G | Gradient value | L | Illumination factor |
| $R(\theta)$ | Reflectivity as a function of the incidence angle | v | Velocity of optic flow |
| I[r] | Three-dimensional space function | i | Index Value |
| D | Ray parameter | S | Semblance value |
| W | Weighted parameter used as a function of a variable | K | Trace number |
| $m_i$ | Midpoint value | M | Smoothing value |
| $h_i$ | Offset value | f | Nonlinear forward modeling operator that predicts data from model |
| $\rho$ | Density | C | Covariance matrix |
| $\tau$ | Time-shift value as variable tau | $\delta d/\delta m$ | Matrix of partial derivatives of data vector with respect to model vector |
| P | Dip angle as a matrix vector | r, m, h, x, y, and z | Other matrices used for formula derivation |
| r | Flattened image gather as matrix vector | D | Length of ray matrix vector |
| p | Step-out | S | Slowness matrix vector |
| P | Image gather | $\Delta t$ | Change in time matrix vector |
| $V_p$ | P-Wave Velocity | | |
| $V_s$ | S-Wave Velocity | | |
| $\theta$ | Angle, Angle of incidence between the reflecting ray and the vertical | | |
| r, m, h, x, y, and z | Variables used for formula derivation | | |
| T | Total travel time matrix vector | | |

We claim:

1. A computer-implemented method for small cave recognition using seismic reflection data in a survey region, the method comprising:
  retrieving a surface seismic reflection data represented in time-domain, comprising data from seismic traces, acquired from a plurality of field receiving sensors;
  retrieving a well log data represented in time-domain, from a well hole containing a small cave;
  computing a final migration velocity model from the retrieved surface seismic reflection data and the retrieved well log data;
  retrieving a generated final migration velocity model from the computed final migration velocity model;
  computing a source wavelet from the retrieved surface seismic reflection data;
  generating the source wavelet from the computed source wavelet;
  retrieving the source wavelet from the generated source wavelet;
  computing a final reverse time migration image gather, using the retrieved surface seismic reflection data, the retrieved final migration velocity model, and the generated source wavelet, employing a finite difference method;
  retrieving the final reverse time migration image gather in depth-domain from the computed final reverse time migration image gather;
  converting the retrieved final reverse time migration image gather, from the depth-domain to the time-domain;
  generating a final reverse time migration image gather in time-domain from the converted final reverse time migration image gather;
  retrieving the final reverse time migration image gather in time-domain from the generated final reverse time migration image gather in time-domain;
  computing an initial root-mean-square velocity model in time-domain from the retrieved final migration velocity model;
  generating a final root-mean-square velocity model in time-domain from the computed initial root-mean-square velocity model;
  retrieving the final root-mean-square velocity model in time-domain from the generated initial root-mean-square velocity model;
  computing a residual normal moveout corrected image gather from the retrieved final reverse time image gather;
  retrieving a residual normal moveout corrected image gather from the computed residual normal moveout corrected image gather;
  computing a final flattened image gather from the retrieved residual normal moveout corrected image gather, employing trim statics correction method;
  retrieving the generated final flattened image gather from the computed final flattened image gather;
  computing a final intercept volume and a final gradient volume using the retrieved final flattened image gather;
  retrieving a generated final intercept volume and a generated final gradient volume from the computed final intercept volume, and the computed final gradient volume;
  computing a multiplication of the final intercept volume and the final gradient volume; and
  generating a small cave identification model from the multiplied intercept and gradient volumes.

2. A computing system apparatus programmed to perform a set of operations of a computer-implemented method for small cave recognition using seismic reflection data, comprising:
  a computer system device for inputting, setting, selecting, outputting, and performing the operations of retrieving, computing, generating, invoking, determining, converting, and correcting;
  a memory resource, for storing data corresponding to the operations of inputting, generating and retrieving, a surface seismic reflection data in time-domain, a well log data represented in time-domain, a final migration velocity model, a source wavelet, a final reverse time migration image gather in depth-domain, a final reverse time migration image gather in time-domain, a final root-mean-square velocity model in time-domain, a residual normal moveout corrected image gather, a residual normal moveout corrected image gather, a final flattened image gather, an initial intercept volume, an initial gradient volume, a final intercept volume, a final gradient volume, a small cave identification model, a user-defined flatness value, an initial migration velocity model, an initial Kirchhoff pre-stack depth migration image gather, a set of initial moveout curves, a Kirchhoff pre-stack depth migration stacking image, a final reflector dip-angle image, a tomographic inversion model, a final Kirchhoff pre-stack depth migration gather, a generated flatness value, a current time-step value, a maximum time-step value, a source wavelet, a forward source-wavefield, a set of source propagated-angles for every source-wavefield, a backward receiver-wavefield, a set of receiver propagated-angles for every receiver-wavefield, a current image gather, a corrected image gather, a final root-mean-square velocity, a set of positive and negative residual normal moveout curves, an initial image gather, a set of relative time shifts for all seismic traces, and a trim statics correction time shift method;

a non-transitory program storage computer-readable memory for performing the operations of inputting, setting, selecting, outputting, retrieving, computing, generating, invoking, determining, converting, and correcting;

a computer system output device for outputting the operations of retrieving, computing, generating, invoking, determining, converting, and correcting; and a system computer, coupled to a computer system input device, coupled to a memory resource, coupled to a non-transitory computer readable memory device, and couple to the computer system output device, for performing the operations of:

retrieving a surface seismic reflection data represented in time-domain, comprising data from seismic traces, acquired from a plurality of field receiving sensors;

retrieving a well log data represented in time-domain, from a well hole containing a small cave;

computing a final migration velocity model from the retrieved surface seismic reflection data and the retrieved well log data;

retrieving a generated final migration velocity model from the computed final migration velocity model from the computed initial migration velocity model;

computing a source wavelet from the retrieved surface seismic reflection data;

generating the source wavelet from the computed source wavelet;

retrieving the source wavelet from the generated source wavelet;

computing a final reverse time migration image gather, using the retrieved surface seismic reflection data, the retrieved final migration velocity model, and the generated source wavelet, employing a finite difference method;

retrieving the final reverse time migration image gather in depth-domain from the computed final reverse time migration image gather;

converting the retrieved final reverse time migration image gather, from the depth-domain to the time-domain;

generating a final reverse time migration image gather in time-domain from the converted final reverse time migration image gather;

retrieving the final reverse time migration image gather in time-domain from the generated final reverse time migration image gather in time-domain;

computing an initial root-mean-square velocity model in time-domain from the retrieved final migration velocity model;

generating a final root-mean-square velocity model in time-domain from the computed initial root-mean-square velocity model;

retrieving the final root-mean-square velocity model in time-domain from the generated initial root-mean-square velocity model;

computing a residual normal moveout corrected image gather from the retrieved final reverse time image gather;

retrieving a residual normal moveout corrected image gather from the computed residual normal moveout corrected image gather;

computing a final flattened image gather from the retrieved residual normal moveout corrected image gather, employing trim statics correction method;

retrieving the generated final flattened image gather from the computed final flattened image gather;

computing a final intercept volume and a final gradient volume using the retrieved final flattened image gather;

retrieving a generated final intercept volume and a generated final gradient volume from the computed final intercept volume, and the computed final gradient volume;

computing a multiplication of the final intercept volume and the final gradient volume; and generating a small cave identification model from the multiplied intercept and gradient volumes.

3. The computing system apparatus of claim 2, wherein the non-transitory program storage computer-readable memory is further programmed to perform the operation of computing a final migration velocity model from the retrieved surface seismic reflection data and the retrieved well log data, further including:

inputting a user-defined flatness value for an image gather;

retrieving the user-defined flatness value for an image gather from the memory resource;

computing an initial migration velocity model in depth-domain with the retrieved surface seismic reflection data and the retrieved well log data;

generating an initial migration velocity model in depth-domain from the computed initial migration velocity model;

retrieving the generated initial migration velocity model in depth-domain from the memory resource;

computing an initial Kirchhoff pre-stack depth migration image gather, using the retrieved initial migration velocity model;

generating an initial Kirchhoff pre-stack depth migration image gather from the computed initial Kirchhoff pre-stack depth migration image gather;

retrieving the generated initial Kirchhoff pre-stack depth migration image gather from the memory resource;

computing a set of baseline moveout curves using the retrieved initial Kirchhoff pre-stack depth migration gather;

generating a set of initial moveout curves from the computed set of baseline moveout curves;

retrieving the generated set of baseline moveout curves from the memory resource;

computing a Kirchhoff pre-stack depth migration stacking image, from the retrieved initial Kirchhoff pre-stack depth migration gather, and the retrieved set of baseline moveout curves;

generating a Kirchhoff pre-stack depth migration stacking image from the computed Kirchhoff pre-stack depth migration stacking image;

retrieving the generated Kirchhoff pre-stack depth migration stacking image from the memory resource;

computing an initial reflector dip-angle image from the generated Kirchhoff pre-stack depth migration stacking image, employing local slant-stacking algorithm;

generating a final reflector dip-angle image from the computed initial reflector dip-angle image;

retrieving the generated final reflector dip-angle image from the memory resource;

computing a tomographic inversion model with the retrieved set of initial moveout curves and the retrieved final reflector dip-angle image;

generating a tomographic inversion model from the computed tomographic inversion model;

retrieving the generated tomographic inversion model from the memory resource;

updating the generated initial migration velocity model with the retrieved tomographic inversion model;

computing a final Kirchhoff pre-stack depth migration image gather from the updated initial migration velocity model;

generating a final Kirchhoff pre-stack depth migration image gather, from the computed final Kirchhoff pre-stack depth migration image gather;

retrieving the generated final Kirchhoff pre-stack depth migration image gather from the memory resource;

generating a flatness value from the retrieved final Kirchhoff pre-stack depth migration image gather;

repeating the steps of computing an initial Kirchhoff pre-stack depth migration image gather, generating an initial Kirchhoff pre-stack depth migration image gather, retrieving the initial Kirchhoff pre-stack depth migration image gather, computing a set of baseline moveout curves, generating a set of baseline moveout curves, retrieving the set of baseline moveout curves, computing a Kirchhoff pre-stack depth migration stacking image, generating a Kirchhoff pre-stack depth migration stacking image, retrieving the Kirchhoff pre-stack depth migration stacking image, computing an initial reflector dip-angle, generating an initial reflector dip-angle, retrieving the an initial reflector dip-angle, computing a tomographic inversion model, generating a tomographic inversion model, retrieving the tomographic inversion model, computing a final Kirchhoff pre-stack depth migration image gather, generating a final Kirchhoff pre-stack depth migration image gather, retrieving the final Kirchhoff pre-stack depth migration image gather, and generating a flatness values; until the generated flatness values is equal to, or less than, the user-defined flatness value; and generating a final migration velocity model.

4. The computing system apparatus of claim 3, wherein the computer system device is further programmed to display a user-interface.

5. The computing system apparatus of claim 3, wherein the computer system device is further programmed to display and print a surface seismic reflection data represented in time-domain, a well log data represented in time-domain, an initial migration velocity model, a final migration velocity model, an image gather, a source wavelet, a final reverse time migration image gather in depth-domain, a final reverse time migration image gather in time-domain, a residual normal moveout corrected image gather, a final flattened image gather, a final amplitude versus angle volume, a set of initial moveout curves, an initial and a final Kirchhoff pre-stack depth migration gathers, a Kirchhoff pre-stack depth migration stacking image, an initial reflector dip-angle image, a final reflector dip-angle image, an updated initial velocity migration model, a user input flat value, a final intercept volume, a final gradient volume, and a small cave identification model.

6. The computing system apparatus of claim 2, wherein the non-transitory program storage computer-readable memory is encoded for computing a final reverse time migration image gather, using the retrieved surface seismic reflection data, the retrieved final migration velocity model, and the computed source wavelet, employing a finite difference method, further comprising the steps of:

inputting a time-step value of zero, and a user-defined maximum time step value;

retrieving the inputted user-defined maximum time step value from the memory resource;

setting an initial reverse time migration image gather equal to zero and at time step value equal to zero;

retrieving a source wavelet from the memory resource;

forward propagating the source-wavefield from the retrieved seismic reflection data, with the retrieved source wavelet using a finite difference method, from the retrieved time-step value of zero to the retrieved input maximum time-step value;

generating a forward source-wavefield from the forward propagated source-wavefield, from the time-step value of zero to the input maximum time-step value;

retrieving the generated forward source-wavefield from the memory resource;

decomposing the retrieved forward source-wavefield into a set of source propagated-angles, using an optic flow method;

generating a set of source propagated-angles, from the decomposed set of forward source-wavefield for every source-wavefield retrieved from the surface seismic reflection data, from the retrieved time-step value of zero to the retrieved user-defined maximum time-step value;

retrieving the generated set of source propagated-angles from the memory resource;

setting a current time-step value, equal to the user-defined maximum time step value;

backward propagating the receiver-wavefield from the retrieved seismic reflection data, at the set current time-step value plus one incremental time-step value, and employing a finite difference method;

generating a backward receiver-wavefield from the backward propagated receiver-wavefield at the current time-step value;

retrieving the generated backward receiver-wavefield at the current time-step value, from the memory resource;

decomposing the retrieved backward receiver-wavefield, at the current time-step value, into receiver propagated-angles, using an optic flow method;

generating a set of receiver propagated-angles at the current time-step value, from the decomposed set of backward received-wavefield at the current time-step value;

retrieving the generated set of receiver propagated-angles at current time-step value, from the memory resource;

combining the retrieved set of source propagated-angles at current time-step value, with the retrieved set of receiver propagated-angles, at current time-step value;

computing a zero-lag cross-correlation value image conditioning for every retrieved source-wavefield and receiver-wavefield, as well as for every combined source and receiver propagated-angle, at current time-step values;

generating a current image gather from the computed zero-lag cross-correlation value at current time-step value;

retrieving the generated current image gather from the memory resource;

retrieving the initial reverse time migration image gather from the memory resource;

adding the retrieved current image gather, to the retrieved initial reverse time migration image gather;
reducing the current time-step value by a one incremental step;
repeating the steps of backward propagating receiver-wavefield from the retrieved seismic reflection data at the current time-step value, generating a backward receiver-wavefield at the current time-step value, retrieving the generated backward receiver-wavefield at the current time-step value, decomposing the retrieved backward-receiver-wavefield into receiver propagated-angles at the current time-step value, generating a set of receiver propagating-angles from the decomposed backward received-wavefield at the current time-step value, retrieving the generated set of receiver propagating-angles at the current time-step value, combining the retrieved set of source propagating-angles at the current time-step value, with the retrieved set of receiver propagating-angles, computing a zero-lag cross-correlation value image conditioning, generating a current image gather from the computed zero-lag cross-correlation value at current time-step value, retrieving the generated current image gather, retrieving the initial reverse time migration image gather, and adding the current angle domain common image gather, to the retrieved initial reverse time migration image gather; until the set of current image gather for every time step value from the input maximum time-step values, to the time-step zero value, was computed and added to the initial reverse time migration image gather; and
generating a final reverse time migration image gather.

7. The computing system apparatus of claim 2, wherein the non-transitory program storage computer-readable memory is encoded for computing a residual normal moveout corrected image gather from the corrected image gather, further including the steps of:
retrieving the final reverse time migration image gather in time-domain from the memory resource;
inputting a set of user-defined root-mean-square velocities;
retrieving the set of user-defined root-mean-square velocities from the memory resource;
computing a set of positive and negative residual normal moveout curves from the retrieved final reverse time migration image gather in time-domain with the retrieved set of user-defined root-mean-square velocities;
generating a set of positive and negative residual normal moveout curves from the computed set of positive and negative residual normal moveout curves;
retrieving the generated set of positive and negative residual normal moveout curves from the memory resource;
computing a semblance spectrum for the retrieved set of positive and negative residual normal moveout curves;
selecting a set of residual normal moveout curves corresponding to the computed semblance spectrum with peak values, from the generated set of positive and negative residual normal moveout curves;
computing a residual normal moveout corrected image gather from the final reverse time migration image gather in time-domain with the selected set of residual normal moveout curves corresponding to the peak semblance spectrum; and
generating a residual normal moveout corrected image gather, from the computed residual normal moveout corrected image gather.

8. The computing system apparatus of claim 2, wherein the non-transitory program storage computer-readable memory is encoded for computing a final flattened image gather from the retrieved residual normal moveout corrected image gather, employing trim statics correction method, further comprising the steps of:
computing a set of relative time shifts between seismic traces from the retrieved residual normal moveout corrected image gather, employing a cross-correlation method;
generating a set of relative time shifts for all seismic traces from the computed set of relative time shifts;
retrieving the generated set of relative time shifts for all seismic traces from the memory resource;
computing a set of trim statics correction time-shifts for the retrieved set of relative time shifts for all seismic traces, using the least-squares inversion;
generating a trim statics correction time-shift model for each seismic trace from the computed set of trim statics time-shifts;
retrieving the generated trim statics correction time shift model from the memory resource;
computing a flattened image gather from the retrieved initial image gather, applying the retrieved trim statics correction time shift model to each seismic trace in the retrieved initial image gather; and
generating a final flattened image gather from the computed set of flattened image traces.

9. The computing system apparatus of claim 2, wherein the non-transitory program storage computer-readable memory is further programmed for computing a final intercept volume and a final gradient volume using the retrieved final flattened image gather, includes the steps of:
computing an amplitude versus angle volume from the retrieved final flattened image gather;
generating a final amplitude versus angle volume from the computed initial amplitude versus angle volumes;
retrieving the generated final amplitude versus angle volume from the memory resource;
computing a final intercept volume and a final gradient volume from the retrieved final amplitude versus angle volumes, using least squares regression analysis; and
generating a final intercept volume and a final gradient volume from the computed final intercept volume and the computed final gradient volume.

* * * * *